(12) United States Patent
Mohamed

(10) Patent No.: US 8,549,326 B2
(45) Date of Patent: Oct. 1, 2013

(54) METHOD AND SYSTEM FOR EXTENDING ENCRYPTING FILE SYSTEM

(75) Inventor: Ahmed Mohamed, Sammamish, WA (US)

(73) Assignee: Blackout, Inc., Sammamish, WA (US)

( * ) Notice: Subject to any disclaimer, the term of this patent is extended or adjusted under 35 U.S.C. 154(b) by 747 days.

(21) Appl. No.: 12/182,948

(22) Filed: Jul. 30, 2008

(65) Prior Publication Data

US 2009/0106549 A1 Apr. 23, 2009

Related U.S. Application Data

(60) Provisional application No. 60/981,493, filed on Oct. 20, 2007.

(51) Int. Cl.
*G06F 11/30* (2006.01)
*G06F 12/14* (2006.01)

(52) U.S. Cl.
USPC .......................................................... 713/193

(58) Field of Classification Search
USPC .......................................................... 713/193
See application file for complete search history.

(56) References Cited

U.S. PATENT DOCUMENTS

| | | | |
|---|---|---|---|
| 6,754,827 B1 * | 6/2004 | Cane et al. ..................... | 713/193 |
| 7,280,956 B2 * | 10/2007 | Cross et al. .................... | 713/171 |
| 7,694,154 B2 | 4/2010 | Youn et al. | |
| 7,770,206 B2 * | 8/2010 | Dillaway et al. ................... | 726/2 |
| 8,033,459 B2 | 10/2011 | Senez, Jr. | |
| 2004/0111608 A1 * | 6/2004 | Oom Temudo de Castro et al. .............................. | 713/156 |
| 2005/0097313 A1 | 5/2005 | Bolosky et al. ............... | 713/150 |
| 2005/0097318 A1 * | 5/2005 | Bolosky et al. ............... | 713/165 |
| 2007/0067620 A1 | 3/2007 | Jevans | |
| 2007/0283443 A1 * | 12/2007 | McPherson et al. ............ | 726/26 |
| 2008/0209225 A1 | 8/2008 | Lord et al. ..................... | 713/185 |

* cited by examiner

*Primary Examiner* — Saleh Najjar
*Assistant Examiner* — Michael Chao
(74) *Attorney, Agent, or Firm* — Knobbe, Martens, Olson & Bear, LLP

(57) ABSTRACT

Users can share encrypted files without having access to other users' public key certificates, by specifying only the other users' identity information. A client agent interacts with a trusted service account to transparently add user encryption certificates to encrypted files after it was created. A header of each encrypted file includes signed encrypted data blocks, file system metadata, and a digital signature. When a user attempting to open an encrypted file is denied access, the client agent transmits the header data and the encryption certificate of the user to the trusted service account, with a request that the user encryption certificate be added to modify the encrypting file system metadata. After the trusted service account determines tampering has not occurred enroute and the user is authorized to access the file, the modified header data are returned to the client agent to enable the user to open the file.

22 Claims, 11 Drawing Sheets

METHOD AND SYSTEM FOR EXTENDING ENCRYPTING FILE SYSTEM

RELATED APPLICATIONS

This application is based on a prior provisional application Ser. No. 60/981,493, filed on Oct. 20, 2007, the benefit of the filing date of which is hereby claimed under 35 U.S.C. §119(e).

BACKGROUND

Microsoft Corporation's prior art WINDOWS™ operating systems include built-in support for transparent file level encryption and decryption for volumes that are formatted with Microsoft Corporation's New Technology File System (NTFS). This feature, which is referred to as an encrypting file system (EFS), provides transparent encryption and decryption of files. A given folder can be marked as encrypted, and files created in the folder can be encrypted without any user intervention. WINDOWS™ EFS uses a symmetric file encryption key (FEK) for each file to encrypt and decrypt the file data. The FEK is encrypted with each user encryption public key and stored in the file EFS metadata information.

However, the WINDOWS™ EFS suffers from several limitations. Specifically, the sharing of encrypted files is limited to a small number of users, and users are required to have access to the encryption public keys of other users to grant those other users access to encrypted files. Some applications, such as WINDOWS™ WebDav Redirector, store and share encrypted files by creating an encrypted file in a local NTFS volume and extracting the file raw encrypted data using EFS backup application programming interface (API) functions. The raw encrypted data are then sent to a second computer where the data can be imported into a local NTFS volume using EFS restore API functions to recreate the encrypted file. Users on the second computer can access the encrypted file if they have a valid encryption certificate private key that decrypts the file encryption key.

Under this encryption system, users are required to explicitly and manually gather all certificates belonging to other users and add them to the shared encrypted files in order to grant any user access to an encrypted file, which may not be possible if some of the users' EFS certificates are not available at the time the shared files are created. This problem is further exacerbated by the fact that users can simultaneously have multiple valid EFS certificates, since EFS allows only a single certificate to be added to an encrypted file for a given user.

The prior art EFS has built-in support to provision each encrypted file with a recovery agent certificate that can be used for data recovery. However, there is no mechanism to select a set of recovery agent certificates at the folder level for use with all of the files in the folder, and users have no control over the recovery agent certificate set.

There are several challenges that need to be addressed to resolve these problems with the EFS. The problems that should be resolved include: (1) determining how to support the sharing of encrypted files among large groups of users without having to manually add each user certificate to each file; and, (2) enabling users to share encrypted files with other users without requiring access to their encryption certificates.

Collapsing multiple user certificates into a single group certificate that is shared among group users would eliminate the need to add other users' certificates to each file and would enable the system to scale to a very large number of users, to enable multiple users to share encrypted files. The system should ensure changes to group membership information are reflected in the group certificate and that only users in the group are allowed access to the encrypted files. This problem can be quite challenging, because the group certificate must be changed with every change in the group membership, since previous members of a group will continue to possess the group private key that enables them to gain access to files, even after leaving the group. Multiple group certificates should be maintained in order to enable access to encrypted files created before a group membership change occurred. Thus, management of group certificates must be made transparent and simple for this scheme to be viable, which is not a trivial problem.

SUMMARY

In view of the limitations of the existing prior art applications for file encryption discussed above, the present exemplary approach disclosed herein provides a new approach for extending the WINDOWS™ EFS, which is more universally functional and more secure in operation than the existing approach. Further, the present novel approach extends the WINDOWS™ EFS either directly or indirectly, so as to provide many new and novel features not previously offered.

In one exemplary embodiment, the EFS is extended to transparently enable sharing of EFS encrypted files, eliminating the need for users to have access to other user certificates to share an encrypted file, and enabling transparent recovery of an encrypted file on a network without sending the entire file over the network. This novel approach is generally directed to both exemplary methods involving software applications and exemplary systems that implement corresponding functions to extend the WINDOWS™ EFS, thereby enabling the sharing of encrypted files within a WINDOWS™ operating system environment. This approach provides a variety of solutions to currently existing deficiencies in the prior art, including but not limited to transparently enabling the sharing of EFS encrypted files between large groups of users; eliminating the need for users to have access to other user certificate keys to share an encrypted file; and, enabling transparent recovery of an encrypted file over the network without sending the entire file. In regard to the latter solution, only the file encryption metadata and security information are exchanged with a network recovery agent service, and it is unnecessary to transmit the entire encrypted file.

In addition, at least one exemplary embodiment uses the concept of a group certificate, but with two key modifications. First, only a public group certificate key is made available to users, which decouples group membership changes from the group certificate, since no user possesses the group private key, which is required to decrypt files. Second, the group certificate private key is delegated to a trusted granting service that acts as a proxy to dynamically grant users access to encrypted files. This network granting service grants or denies a specific user access based on access control information that is stored in the encrypted files. A transparent client-side file system agent ensures that the granting encryption certificates are added to encrypted files and thereby enables the service to add additional certificates for other users or groups at a later time.

The transparent client-side encrypting file system agent also monitors user access to encrypted files and communicates with the trusted granting service, as required, to dynamically and transparently enable user access. The client-side encrypting file system agent and granting service use a novel mechanism to exchange only EFS metadata information of encrypted files and user public encryption certificates, which are then readily available when the encrypted files are accessed.

The present novel approach provides numerous key functions to accomplish its intended purpose, including the use of group certificates to collapse multiple user certificates into a single group certificate, when the multiple users comprise a distinct group. It also eliminates the need to have access to all users' certificates at the time that files are created. The addition of other user encryption certificates to shared encrypted files can therefore be deferred until a file is accessed by a user who does not yet have a certificate in the encrypted file metadata, instead of being required at the time of file creation. A user's attempt to access an encrypted file can be transparently intercepted to enable that user's encryption certificates to be added to the file, so that the user's attempt to open a file is only briefly delayed while the user's encryption certificate is added to the encrypting file system metadata. Files can be provisioned at encryption time with a trusted service account encryption certificate that can subsequently be used to add user certificates to the encrypted files. The trusted service certificate should only be enabled to add user certificates, but should be unable to decrypt file data. An access control list or security descriptors for encrypted files can be transparently stored as part of file encryption metadata information in each file. The trusted service can then add users to the list of those authorized to access encrypted files, based on file EFS metadata information and current group membership information.

More specifically, an exemplary method for transparently managing user access of encrypted files includes the step of provisioning each encrypted file with a trusted service account encryption certificate that enables a trusted service to add one or more encryption certificates to the encrypted file for one or more users or other entities that should be authorized to access a content of the encrypted file. Also provided in the encrypted file are special signed encrypted data blocks that include authorization information indicating one or more entities that can access the encrypted file, encrypting file system metadata for the encrypted file that are signed with a signing key, and a digital signature determined by hashing the encrypting file system metadata and special encrypted data blocks and using a signing key. When a user attempts to access an encrypted file, access to the encrypted file is granted to the user if the authorization information explicitly indicates that the user should be granted access. If not, the method provides for determining whether the user should be granted access to the encrypted file based either on a security descriptor for the file or a resource identifier that is included in the authorization information of the special encrypted data blocks; and if so, the trusted service adds an encryption certificate for the user to the encrypting file system metadata, so that the user is granted access to the encrypted file. However, if the user is not specified in the authorization information and it is determined that the user should not be granted access to the file based on the authorization information, the user is denied access to the encrypted file.

The addition of the encryption certificate for the user to the encrypting file system metadata by the trusted service involves several steps. These steps include transmitting a request to add the encryption certificate for the user to the encrypting file system metadata of the encrypted file, to the trusted service. The request includes the special encrypted data blocks, the encrypting file system metadata, and the digital signature from the encrypted file. The special encrypted data blocks, and the encrypting file system metadata are loaded into a temporary encrypted file by the trusted service. The trusted service then computes a test signature value for the special encrypted data blocks and the encrypting file system metadata using a signing key that is included with the special encrypted data blocks. The test signature value that was thus computed is compared with the signature value from the encrypted file. If the test signature value matches the signature value from the encrypted file, the trusted service determines if the user should be granted access to the encrypted file, based upon authorization information for the encrypted file. If so, an encryption certificate public key for the user is added to the encrypting file system metadata. But, if the user should not be granted access to the encrypted file, the user is denied access to the encrypted file.

If it is determined that the user should be granted access, but a policy does not grant key delegation to the trusted service, the step of adding the encryption certificate for the user comprises the step of adding the encryption certificate public key for the user to the temporary encrypted file to create updated encrypting file system metadata. The updated encrypting file system metadata is then extracted from the temporary encrypted file, and the updated encrypted files system metadata is returned for use by the user in accessing the encrypted file.

Conversely, if a policy grants key delegation to the trusted service, the step of adding the encryption certificate public key for the user includes the step of identifying an encryption certificate that should be returned to a caller that requested the user to be authorized to access the encrypted file. The encryption certificate private key is signed and encrypted, and the encrypted certificate private key is returned to the caller, to enable the caller to determine who accesses the encrypted file based on the authorization information.

To determine the digital signature, the special signed encrypted data blocks and the encrypting file system metadata are extracted from the encrypted file. A hash function is then applied to the special signed encrypted data blocks and the encrypting file system metadata to produce a hash value. The digital signature is computed by digitally signing the hash value with a private signing key.

To determine whether the user should be granted access to the file, the method provides for determining if the authorization information includes a list of users, or groups, or other entities authorized to access the encrypted file. If not, the method determines if the authorization information includes a resource identifier, and if so, the resource identifier is mapped to an authorization policy for the encrypted file that is indicated by the resource identifier so that a security descriptor defined by the authorization policy can be obtained. Otherwise, if the authorization information does not include the resource identifier, the security descriptor is created from data stored in the encrypting file system metadata. The stored data include at least one of an encryption certificate identifier for the user; and a security identifier for the user. The method then provides for determining if the security descriptor that was obtained or created grants the user read access rights for the encrypted file. If so, the user is granted access to the encrypted file, but if not, the user is denied access to the encrypted file.

When creating the security descriptor, the method provides for reading entries of encryption certificate identifiers, and security identifiers that are included in the encrypting file system metadata of the encrypted file. For each entry that is read, an attempt is made to lookup an object represented by an entry of a security identifier value in an active directory for a network in which the encrypted file is to be accessed. If an entry is found, an attempt is made to lookup an entry of an encrypted certificate in a user encryption certificate attribute using the encrypted certificate identifier, and if found, the method determines if the security identifier represents a user object. If so, a security descriptor is created with read access rights for the user, and any remaining entries are similarly processed. However, if the results from any of these steps are negative, the entry is skipped, and any remaining entries are similarly processed. The security descriptor that was created is then returned.

If the authorization information includes a list of users, or groups, or other entities authorized to access the encrypted file, the method provides for determining if the user requesting access to the encrypted file is specified in the list, and should thus be granted access to the encrypted file. If not, a security descriptor is created from the list of users or a group list. The method then determines if the security descriptor grants the user requesting access at least read data access rights for the encrypted file, so that the user can be granted read data access.

The resource identifier included in the authorization information can reference a specific trusted location that is authoritative, such as a root of a domain-based distribution file system, where the encrypted file was stored. This information can be useful in determining the policy that should be applied to determine if a user should be granted access to the encrypted file.

Other aspects of this novel technology are directed to memory media on which are stored machine readable and executable instructions so that when the machine instructions are executed by a processor, the processor carries out functions that are generally consistent with the steps of the method discussed above.

Yet another aspect of the technology is directed to a system for responding to a request to enable a user to access an encrypted file like that described above. The system includes a communication link for receiving the request. When transmitted, the request includes the special signed encrypted data blocks, the encrypting file system metadata that are signed with the signing key, and the digital signature, but does not include the actual data content of the encrypted file. Also included in the system are a processor that is coupled to the communication link, and a memory coupled to the processor. The memory stores machine instructions that are executed by the processor to implement a plurality of functions that are generally consistent with the steps of the method described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
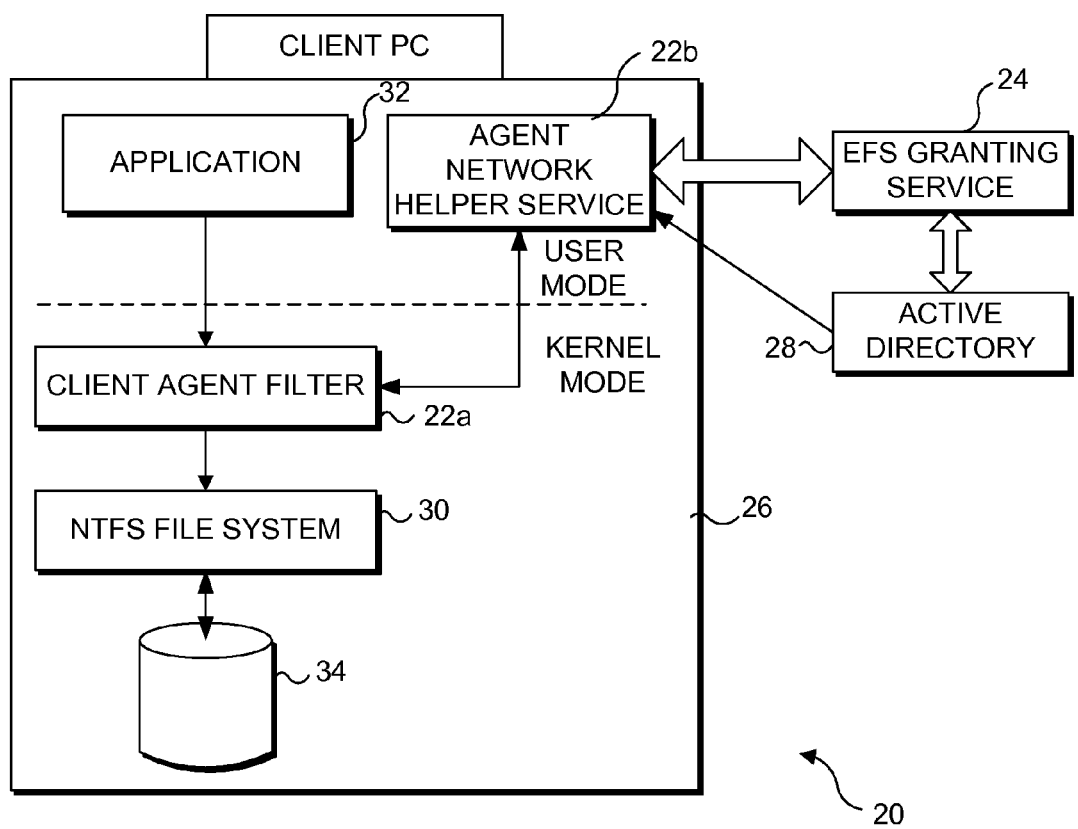
FIG. 1 is a diagram illustrating an exemplary embodiment of the entire system architecture for extending the WINDOWS™ EFS according to the present novel approach.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview

An exemplary embodiment 20 of the present novel approach includes two modules: (a) a client agent (which is identified in this Figure as including a client agent filter 22a and an agent network helper service 22b); and, (b) an encrypted files system granting service (EFSGS) 24, as shown in FIG. 1. The client agent is a file system intercept mechanism that runs on all client computers, such as a client personal computer (PC) 26 that is shown in this Figure, an example of which is shown in greater detail in FIG. 12. The EFSGS is a trusted network service that receives requests from the client agents on behalf of corresponding users and grants the users access to encrypted files, based on security information stored in the encryption metadata portions of the encrypted files. While the EFSGS might be implemented on almost any computer, it will likely be implemented on a network or domain server, on using an Internet web server.

As used herein, the concept of a user "accessing an encrypted file" means at least enabling the user to open or read the contents of the encrypted file, i.e., providing a user with at least read rights. Clearly, to read the contents of an encrypted file, it must first be decrypted. By adding an encryption certificate for the user to the encryption metadata of the file at a time subsequent to the creation of the file, the present approach can dynamically facilitate enabling a user who should be authorized to access the encrypted file, the ability to do so. An advantage, but not a necessary characteristic of the present novel approach, is that it transparently facilitates adding the encryption certificate of the user to the encrypted file, so that the user need not be aware of the many steps that are being carried out to do so. Thus, the user can select an encrypted file within an application or from a directory listing and selectively attempt to open it. Under the present approach, the user need not discern that the initial attempt to open the encrypted file is denied, or that in response to this denial, the encryption certificate of the user is added to the encrypted file so that it is then accessible by the user, enabling the user to open the file. However, it will be apparent that this transparent access provides a substantial benefit and adds to the efficiency of the system enabling the user to access and open an encrypted file that the user should justifiably be able to open.

The EFSGS leverages Microsoft Corporation's WINDOWS™ operating system Active Directory 28 to store its certificates and to obtain group membership information. Clients can discover and access the EFSGS public encryption certificate from the Active Directory. It is this public encryption certificate that provides the authorization for the EFSGS to grant user certificates to new users subsequently after a file has originally been created and encrypted. FIG. 1 depicts the overall system architecture and outlines the relationship between WINDOWS™ NTFS file system 30, the client agent, EFSGS 24, and Active Directory 28. Alternatively, the EFSGS can be used in a non-domain environment, such as the Internet, e.g., as a web service, and clients can request the public key certificate for a given group directly from the EFSGS service.

Client Agent

As noted above, the client agent comprises client agent filter 22a, which acts as a file system intercept mechanism in kernel mode, and in user-mode, as agent network helper service 22b. The file system intercept mechanism runs as part of the WINDOWS™ operating system-protected address space and provides at least two essential functions. First, the client agent filter can transparently add a set of pre-defined encryption certificates to all files in a folder, such as a folder used by an application 32 to store the encrypted file, based on some defined policy (policies are explained below) or can include a reference to the pre-defined policy. It is important to understand that a pre-defined policy is administratively defined for the user or computer and is outside the control of an application. Moreover, the policy is transparent to an application. The policy can control the encrypted certificates for a set of encrypted files that are stored at a specified location, e.g., in a given folder file tree and The client agent filter also transparently digitally signs EFS metadata information of encrypted files and transparently intercepts access denied errors to open encrypted files. In addition, the client agent filter transparently updates the EFS metadata via the EFSGS on behalf of a user who needs to be added to the EFS metadata, to enable the user to access the encrypted file, at a time after the file was originally encrypted. Whenever a new encrypted file is created, the client agent filter determines the set of encryption certificates to be added, for example, based on its predefined policy for the folder in which a file is stored, or based on the user(s) and/or group(s) that should be able to access the encrypted file and calls on the operating system to add the certificate set to the newly created encrypted file before the file is saved under the folder, in a storage 34. In this manner, all encrypted files created or modified under a given folder always have the correct set of encryption certificates initially applied to them. Moreover, the process of subsequently adding additional encryption certificates for other users, to enable them to subsequently access the encrypted files is totally transparent to those users and applications that are authorized to interact with the encrypted files.

Agent network helper service 22b communicates with the client agent filter to issue EFS backup API calls that are only available in user mode. The agent network helper service downloads group encryption certificates from the Active Directory, or EFSGS, or some other authoritive certificate store, as required and makes RPC calls to the EFS granting service on behalf of the client agent filter. Finally, the agent network helper service can process policy information and configure the client agent filter with a list of folder scope certificate sets. For example, the system can be configured via a policy that all files created under a given folder should be provisioned with a specific set of encryption certificates. The policy may apply to all files in the folder hierarchy or files that are stored in sub-folders of the target folder. As used herein in connection with certificate sets, the term "scope" means a folder sub-tree.

A secondary method leverages an EFS file recovery framework and defines the EFSGS as a file recovery agent, which causes a certificate for the EFSGS to be automatically included with all encrypted files when they are initially created. This certificate, along with the user name and user ID that is signed, is stored in the signed encrypting file system metadata for the encrypted file to enable the user who may have lost an encryption certificate that was originally used to create the encrypted file. The user's encryption certificate may have been lost when the user's computer failed. The EFSGS knows the user's name based upon the user signing on the domain or network and can subsequently enable the user to access the encrypted file using a new user encryption certificate that has been added by the EFSGS to the encryption file system metadata for the file. Ideally, the file security information should be preserved by the EFS across backup and restore operations. However, this functionality is currently missing from EFS under the prior art approach and requires an external mechanism to capture encrypted file security information to be included as part of an encrypted file backup operation. In contrast, under the present novel approach, the client agent captures encrypted files security descriptor information and stores the information in the files' encryption metadata. An encrypted file security descriptor can thus be scanned to build a list of principle names of users and groups that have been granted access to the file. The list is then pruned to eliminate built-in accounts and stored as part of the encryption metadata information of the file. The client agent creates special encrypted data blocks on the encrypted file and writes the access control list to it. This technique enables the EFSGS to later determine a file access control list without having to maintain mappings between its certificates and authorized users and groups who should have access to the encrypted files.

In summary, the functions performed by the EFSGS include creating and publishing the group encryption certificates in the Active Directory (or in some other authoritive directory store), granting users access to encrypted files by dynamically updating the EFS metadata information of encrypted files, deriving an authorization policy from the Active Directory based on each request for EFS metadata information, and leveraging Microsoft Corporation's Authorization Manager (AzMan) dynamic groups to provide exceptions and override policies. Further the EFSGS provides a key delegation mechanism for specific scenarios such as encrypted policy and net logon files.

Adding User to Encrypted File in Response to a Request Message

Figure 2:
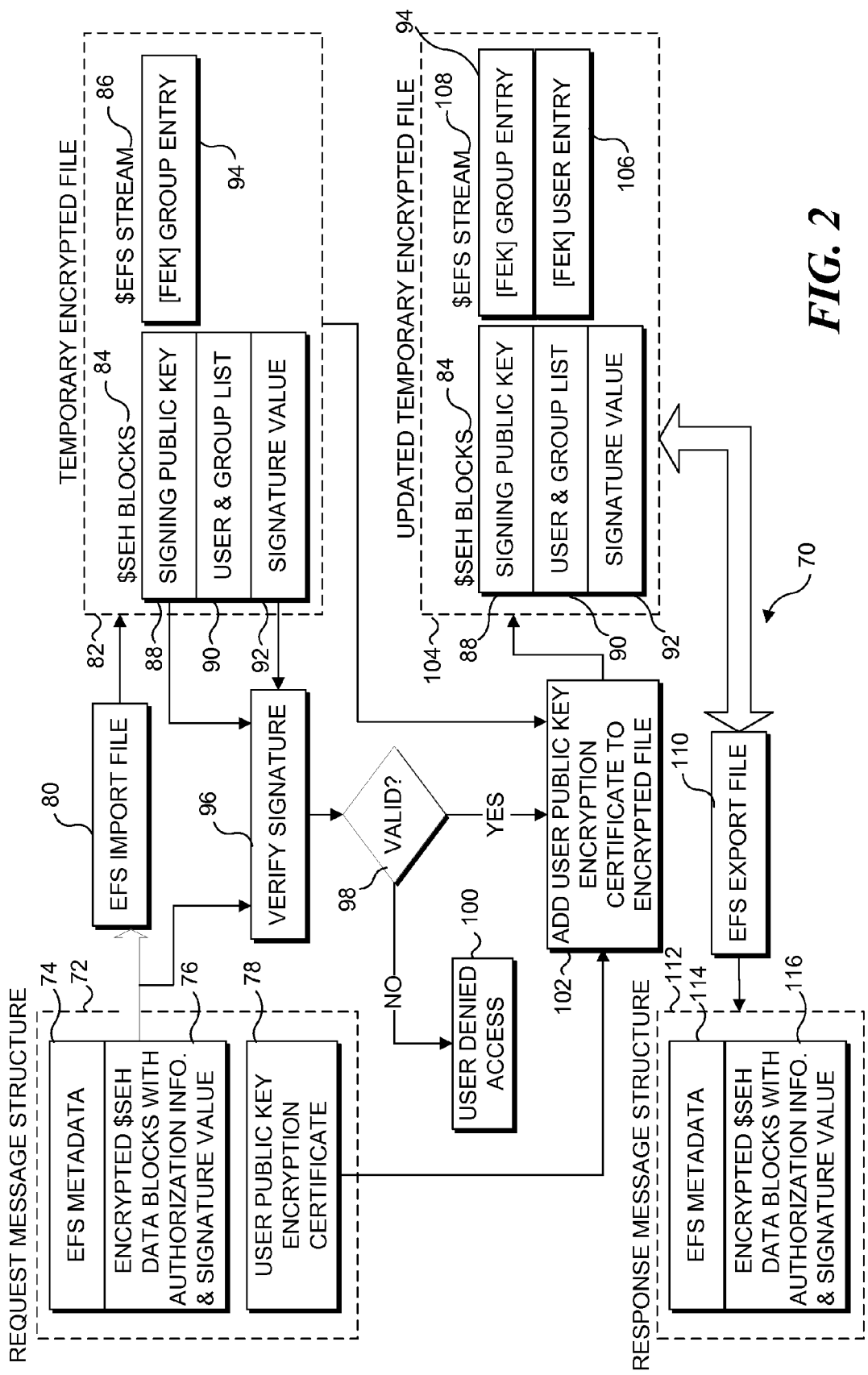
FIG. 2 is a diagram illustrating the structure of request and response messages and steps performed by the encrypted files system granting service to add a user to an encrypted file, so that the user can access the encrypted file.

FIG. 2 illustrates a schematic block diagram 70 showing exemplary steps performed in response to a request message, to add a user to the list of those permitted access to an encrypted file (i.e., to the authorization information for the encrypted file), in accord with the present novel approach. This process begins when a request message 72 to add a user to those authorized access to the encrypted file is received by the EFSGS. The request message includes EFS metadata 74 that are signed, and encrypted $SEH data blocks 76, which have been extracted from the encrypted file for inclusion in the request. The encrypted $SEH data blocks include authorization information, which may already explicitly identify one or more users and/or one or more groups whose members are authorized to access the encrypted file, or which may indicate a pre-defined security policy for determining who is so authorized. Also included in the request message is the public key (i.e., user encryption certificate 78) for the user who is requesting access to the encrypted file. The EFS metadata and encrypted $SEH data blocks are conveyed as an EFS import file 80 that is transmitted by the client agent to the EFSGS, which creates a temporary encrypted file 82. The request message also causes a digital signature verification to be carried out by the EFSGS in a step 96, based on a signing public key 88 that is applied to hash the EFS metadata and the encrypted $SEH data blocks in the request message, producing a resulting test signature that is compared to a signature value 92 that is included in $SEH data blocks 84 of the temporary encrypted file. The temporary encrypted file further includes an $EFS stream 86 that comprises a file encryption key (FEK) group entry 94 for the encrypted file. The results of the signature verification in step 96 are input to a decision step 98, which determines if the test signature just computed is equal to signature value 92, and therefore valid. If not, the user is denied access to the encrypted file in a step 100. Conversely, if the computed signature was found to be valid in decision step 98, a step 102 adds the user's public key to temporary encrypted file 82, producing an updated temporary encrypted file 104. This updated temporary encryption file is identical to temporary encrypted file 82, except that a $EFS stream 108 for the updated temporary encryption file comprises both [FEK] group entry 94 and an [FEK] user entry 106. Updated temporary encrypted file 104 is conveyed as an EFS export file 110 in a response message 112 that includes revised EFS metadata 114 (revised, since they now include the new [FEK] user entry) and encrypted $SEH data blocks 116. This response message transparently enables the user requesting access to the encrypted file to access its contents. Further details are provided in the Summary below.

Exemplary Steps for Creating an Encrypted File

Figure 3:
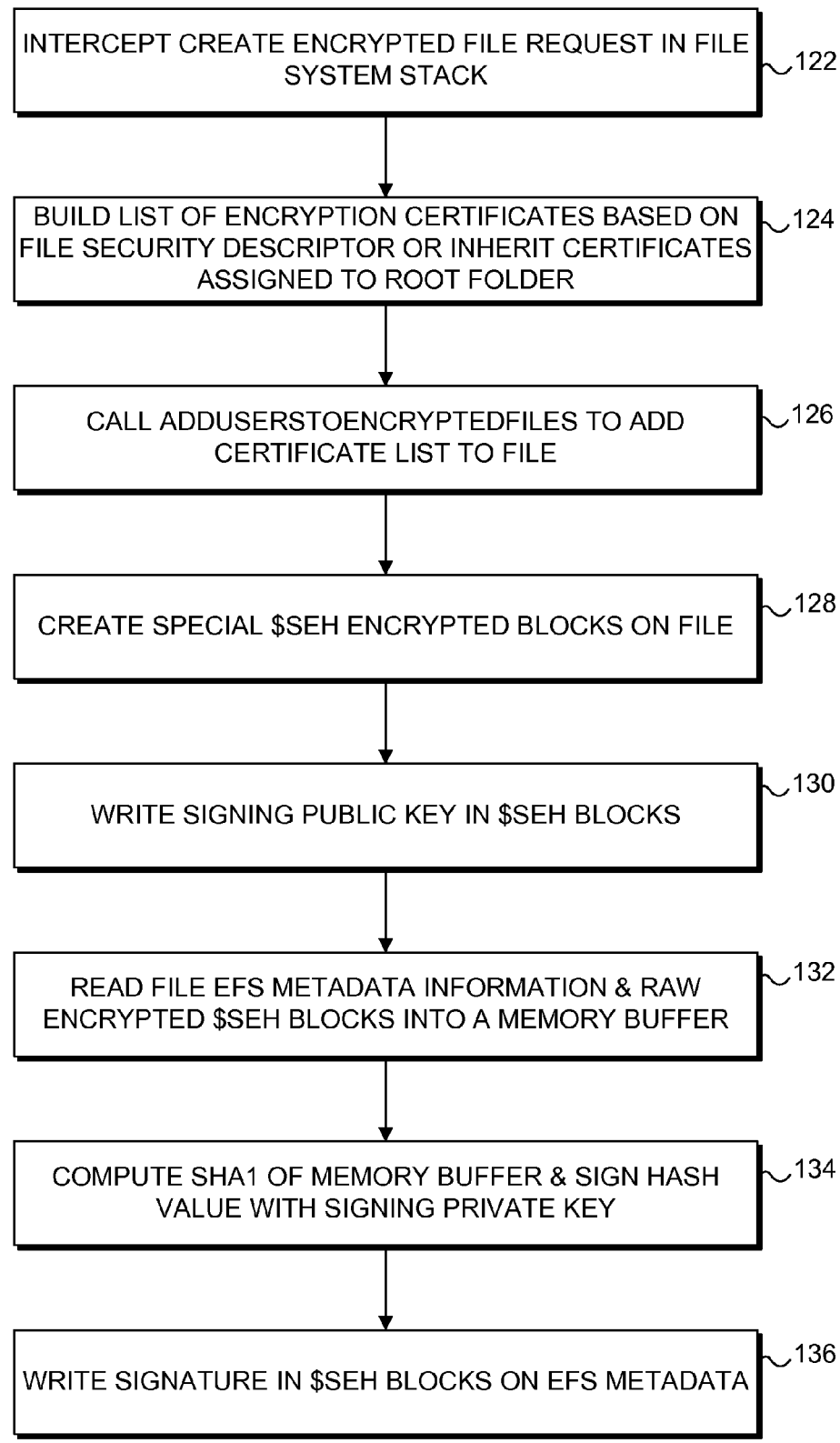
FIG. 3 is a schematic diagram illustrating exemplary steps taken by a client agent to provision encrypted files with security information and certificate set.

FIG. 3 illustrates exemplary logical steps 120 that indicate how the client agent provisions an encrypted file with security information and a certificate set when the encrypted file is initially created. This process starts in a step 122 when the client agent intercepts a request to create an encrypted file in the file system stack. A step 124 provides for building a list of encryption certificates based on the file security descriptor or by inheriting the list of encryption certificates assigned to the root folder in which the file is stored. These encryption certificates can be for one or more users and/or one or more groups who are authorized to access the encrypted file. Next a procedure "AddUserToEncryptedFiles" is called in a step 126 to add the encryption certificate list to the file. A step 128 creates special $SEH encrypted data blocks on the file, and a step 130 writes the signing public key in the $SEH encrypted stream. In a step 132, the file EFS metadata information and raw encrypted $SEH data blocks are read into a memory buffer with a procedure ReadEncryptedFileRaw. A step 134 computes the SHA1 hash of the data stored in the memory buffer and then signs the resulting hash value with the signing private key (corresponding to the public key in a public/private key pair). The resulting signature is next written into the $SEH data block portion of the EFS metadata in a step 136, which completes the provisioning of the encrypted file.

Encrypted Files System Granting Service (EFSGS)

EFSGS 24 (shown in FIG. 1) owns multiple encryption certificates and runs in two different modes. In an automatic mode, the EFSGS scans Active Directory 28 for groups, distribution lists, and computer objects and automatically generates EFS certificates for each object, having confirmed that the user and/or group or other object is valid on the domain or network. It also publishes the encryption certificate public key in the user certificate attributes of the objects in the Active Directory. In auto-recovery mode, EFSGS 24 acts as an automatic file recovery agent and utilizes the EFS file recovery framework. EFSGS 24 is administratively provisioned with file recovery certificate private keys to grant it access to encrypted file metadata—but not access to the actual encrypted file data content.

The EFSGS core functionality grants users access to encrypted files that they are authorized to access but for which they lack a valid private key to decrypt the file. Client agent filter 22a (also shown in FIG. 1) intercepts failed user attempts to access encrypted files and coordinates with EFSGS 24 to dynamically and transparently grant user access to encrypted files (assuming that a user rightly should be able to have read access to the files). As explained above in connection with FIG. 2, the client agent filter extracts the EFS metadata information for an encrypted file and sends it to EFSGS 24, along with the user EFS public key certificate. The EFSGS first authenticates the user to confirm the user identity on the domain or network and extracts the file security information from the EFS metadata file information. The user that initiated the call for accessing the EFSGS is checked against the file security information to determine whether to grant or deny the user access to the encrypted file based on the authorization information in the EFS metadata for the file. If the user is authorized access, the EFSGS updates the EFS metadata information so that the authorization information includes the specified user public key, thus granting the user access to the encrypted file. The updated EFS metadata information is returned to the client filter agent that transmitted the request. The client filter agent modifies the local encrypted file EFS metadata information with the new updated EFS metadata obtained from EFSGS and re-issues the user request to the local file system, which will now enable the user to access the data in the encrypted file.

The EFS metadata information can only be updated if it contains at least one encryption certificate indicating that the EFSGS owns the corresponding private key. Otherwise, the EFSGS won't have access, and the request to add the user certificate is denied. This novel dynamic granting scheme works because the file encryption key that is used to encrypt and decrypt the file data is preserved across user certificate add operations, and during file backup and restore operations.

Summary (Further Details Corresponding to the Steps of FIG. 2):

a. The client agent ensures user encryption certificates are transparently added to new and modified encrypted files.

b. The client agent uses a predefined policy that specifies a set of encryption certificates to be applied to encrypted files stored under a given folder.

c. The client agent transparently enables encrypted files security information to be included as part of raw encrypted format files that are being created.
d. Whenever an encrypted file is being opened, and the file system fails the user's open request with access denied due to lack of a valid user encryption certificate for the user being included in the EFS metadata authorization information, the client agent resolves the error condition transparently, so that the user is unaware.
e. The client agent extracts and sends the EFS metadata information and $SEH data blocks from the file to the EFSGS along with the user current public key EFS certificate.
f. The EFSGS authenticates and confirms the identity of the user.
g. The EFSGS imports the EFS metadata information and raw encrypted $SEH data to create a local encrypted file.
h. The EFSGS reads the signing public key, file security information, and signature value from the $SEH stream.
i. The EFSGS verifies the signature of the EFS metadata and $SEH streams to ensure that tampering with the data has not occurred since the client agent authored the file.
j. The EFGS checks whether the calling user has access to the file by checking the user access against the file security information. If no security information is found for the user, or the user is not granted access, the EFSGS scans the certificate set in the file and performs the following access check:
  i. If the certificate is a self-signed certificate, then it is ignored;
  ii. If the certificate is a domain certificate that belongs to the calling user, then the user is granted access;
  iii. If the certificate is a domain certificate that belongs to a group (security or distribution) having access to the file, and the user seeking access is a member of the group (determined by checking the memberof attribute in the Active Directory), then the user is granted access;
  iv. If the certificate maps to a valid policy definition, and the policy definition contains a security descriptor that authorizes the user access, then the user is granted access;
  v. Otherwise, the user is denied access, and the request fails.
k. If the user is granted access, then the specified user certificate is added to the local encrypted file.
l. The encrypted file EFS metadata is exported into a memory buffer.
m. The buffer content, i.e., the updated EFS metadata information, is returned to the client agent, and the EFSGS local file is deleted.
n. If the client agent receives a "success" response from the EFSGS, then the client agent reconstructs the local file EFS metadata information from the updated version received from the EFSGS.
o. The client agent tags the updated file as being processed for this user and replays the open request to the file system, to enable the user to access the encrypted file.

Flow Chart for Handling User Access to an Encrypted File

Figure 4:
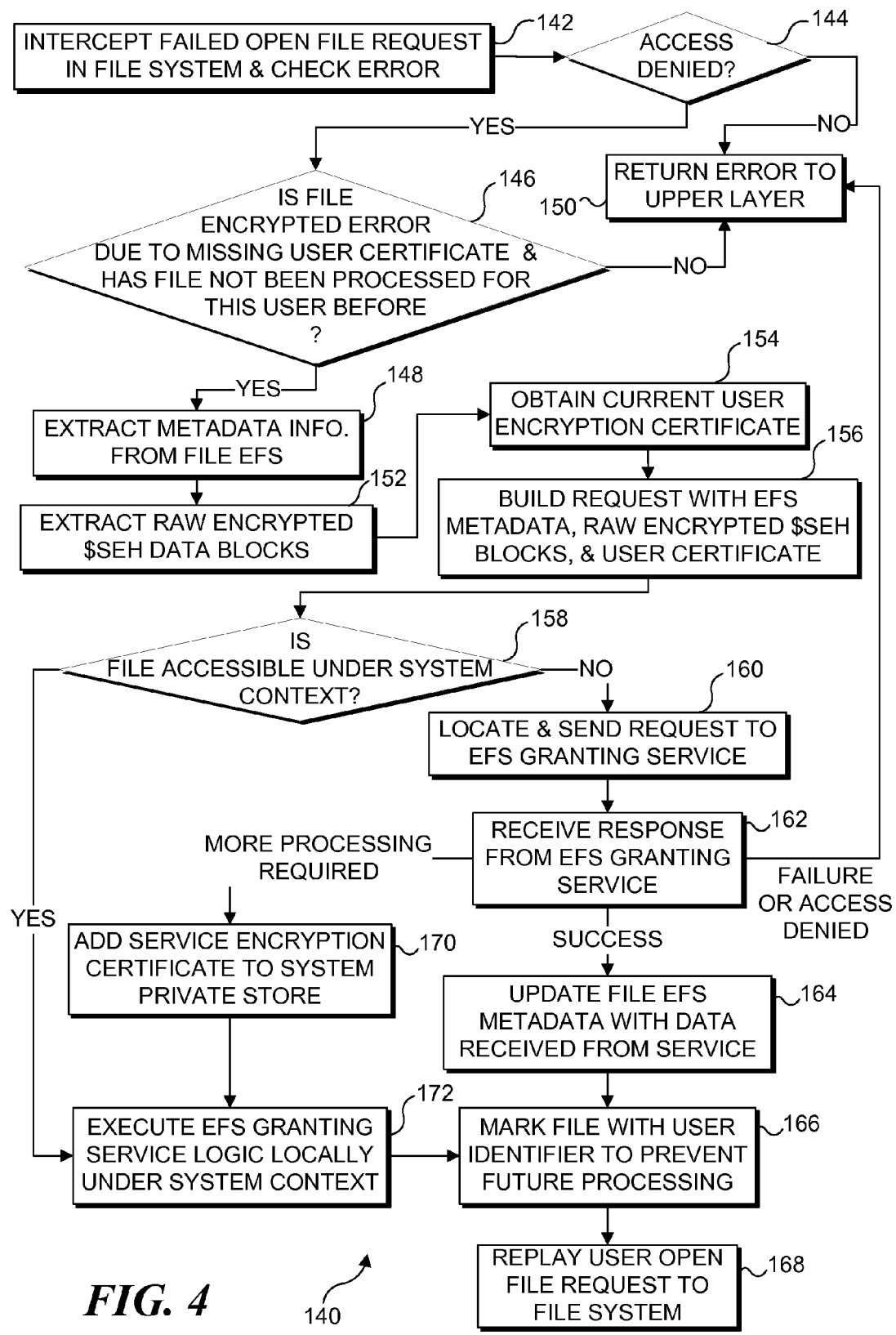
FIG. 4 is a schematic diagram illustrating an exemplary client agent technique for transparently enabling user access to encrypted files.

When a user makes a request to access an encrypted file, the user can typically do so transparently if an [FEK] user entry has already been included in the encrypted file. Exemplary logical steps 140 in FIG. 4 illustrate how the attempt by a user to access an encrypted file is handled if the open file request has initially failed. A step 142 provides that the client agent filter intercepts the failed open file request in the file system and checks the nature of the error. A decision step 144 determines if the user was denied access. If so, a decision step 146 determines whether the file encryption error is due to a missing user certificate, i.e., the missing [FEK], and if the file has not previously been processed for the present user. If so, the logic proceeds to a step 148, which extracts the EFS metadata information from the file. However, if the response to decision step 146 is negative, a step 150 returns the error to an upper layer for further processing. In connection with the above logic, when the client agent intercepts access denied errors, the local file system doesn't indicate what actually caused the error. The error might have been because the user doesn't have a certificate to access the encrypted file or because the file security descriptor doesn't grant the user access, or because the user is requesting access to the file that the security descriptor doesn't allow. The client agent is only concerned with the condition that the user doesn't have the right certificate and must determine whether to contact the service or determine that the error is actually legitimate.

Following step 148, a step 152 extracts raw encrypted $SEH data blocks from the file. A step 154 then obtains the current user encryption certificate. Next, a step 156 builds a request message using the EFS metadata, the raw encrypted $SEH blocks, and the user certificate. A decision step 158 determines if the file is now accessible under the system context, using this newly built request message. If not, a step 160 locates and sends the request message to the EFSGS. In a step 162, the response message is received from the EFSGS. This response message can indicate that the request failed or that access was denied, which then leads back to step 150. Conversely, the response can indicate success, leading to a step 164, which updates the file's EFS metadata with data received from the EFSGS. In a step 166, the file is then marked with the user identifier, to prevent future processing, i.e., to indicate that the file has already been processed for this user (see decision step 146). If the response from the EFSGS in step 162 indicates that more processing is required, a step 170 adds a service encryption certificate to the system private store. Specifically, if the EFSGS returns an indication that more processing is required, this response means it returned the client the private key that can decrypt the file, i.e., it implements the key delegation method. The client agent must then import this private key into the local store to make the private key available to the local file system. Thereafter (or, if the result in decision step 158 is positive), a step 172 executes the EFSGS logic locally under the system context. Following step 172, step 166 is carried out. After step 166, a step 168 replays the open file request from the user to the file system, which should now enable the user to access the encrypted file.

Logic for Processing Add User Request

Figure 5:
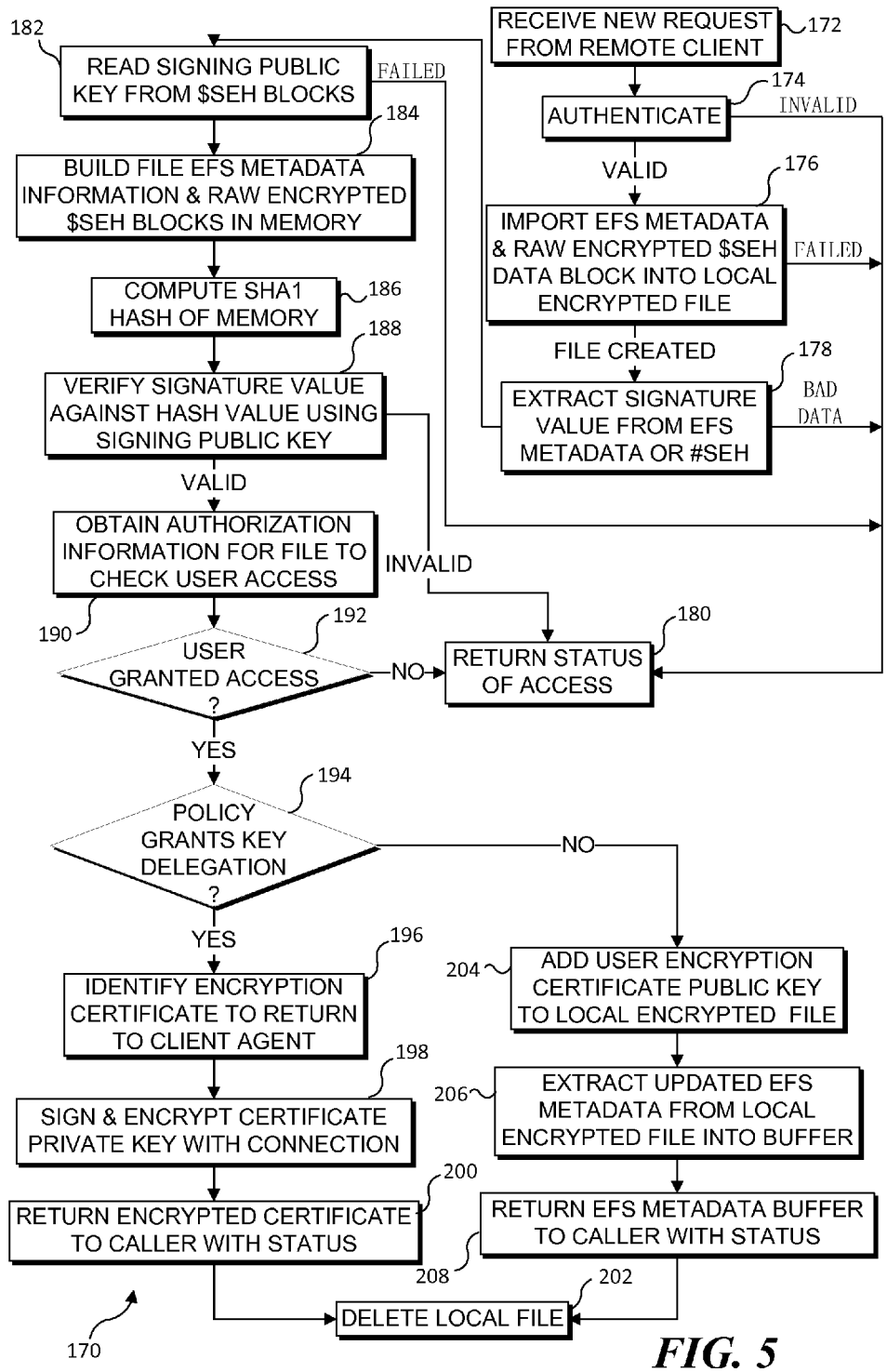
FIG. 5 is a schematic diagram showing exemplary steps that are carried out by the trusted service in responding to a request to add a user encryption certificate to an encrypted file.

When an add user message request is received from a remote client, the EFSGS responds by carrying out a number of steps. Exemplary logical steps 170 for responding to such a request are illustrated in FIG. 5. As indicated in a step 172, a new user request is received from the remote client. A step 174 authenticates the request, and if it is valid, the logic proceeds to a step 176. Otherwise, the logic continues with a step 180, which returns the status access. In connection with the last step, the service must first authenticate the user making the call to obtain the caller identity. If an error occurs, that error is returned to the client. It's up to the client to map the error to an access denied response. For example, the user might have used the wrong password to authenticate to the service, and in this case, returning access denied is the wrong error, because the user can re-enter the correct password and obtain access to the file. Step 176 imports EFS metadata and raw encrypted $EFS data blocks into the local encrypted file to which the new user is to be added. This step should create the encrypted file. If it fails, the logic again proceeds to step 180. Otherwise, a step 178 extracts the signature value from the EFS metadata or #SEH stream. If this step is unsuccessful because of bad data, the logic again proceeds to step 180, but otherwise, continues with a step 182, which reads the signing public key from the $SEH stream. If this step fails, the logic proceeds to step 180, but if it does not fail, the logic continues to a step 184. Step 184 builds the file EFS metadata information and the raw encrypted file and stores the results in memory. Note that the request includes the signature value of the EFS metadata and $SEH, but the signature must be computed without knowledge of the value of the signature. This step reproduces the same buffer layout of the EFS metadata header and $SEH as the client agent would have done to compute the signature in the first place. A step 186 then computes an SHA1 hash of the data just stored in the memory. In a step 188, the resulting hash value is verified against the signature value using the signing public key. If the verification indicates that the hash value is invalid, the logic again proceeds to step 180.

However, if the hash value is verified in step 188, a step 190 obtains authorization information for the encrypted file to check user access. A decision step 192 determines if the user has been granted access, and if not, the logic again proceeds to step 180. If the user has been granted access, the logic proceeds to a decision step 194, which determines if the predefined security policy for the system grants key delegation. If so, a step 196 identifies the encryption certificate to return to the client agent. Next, a step 198 signs and encrypts the certificate private key with the connection. Step 198 is for the key delegation case, and the certificate private key is being returned to the client. However, the private key MUST be protected when transmitted over the network connection. In order to protect the private key, the connection between the client agent and EFSGS service must be encrypted. A step 200 returns the encrypted certificate to the remote client or user requesting access to the file, with the status of the request. A step 202 then deletes the temporary local encrypted file. The EFSGS uses standard public Windows EFS APIs to tunnel user certificates into the EFS metadata. The only way to do this is to create a local temporary file from the request EFS metadata header and $SEH stream. The EFS API can then be used to add the requesting user public key. This add operation is implemented by the Windows Operating System, for example, and is only visible through a file-based API. But, once the service has added the user to the file and exported the file in it's raw encrypted format, the temporary file is no longer needed and is deleted from the file system.

If the security policy in decision step 194 does not grant key delegation, a step 204 adds the user encryption certificate public key to the local encrypted file. A step 206 extracts the updated EFS metadata from the local encrypted file into a buffer. In a step 208, the EFS metadata in the buffer is returned to the remote client or user requesting access to the encrypted file, with the status of the request. The local encrypted file is then deleted in step 202, as noted above.

File Security Information

The Client agent maps an encrypted file security descriptor into a list of principles that are granted read access. The list is pruned to remove all built-in group and user accounts, i.e., accounts that apply to every file on the system. The list is then signed to ensure its integrity and stored encrypted inside the file metadata information. Client computers are configured with EFS recovery agent certificates that are automatically added by EFS to every encrypted file. The EFSGS is provisioned with the private key of the recovery agent certificate and uses the file security lists to determine user access. The system is not required to use group certificates in this scheme.

Alternatively, applications and users can explicitly add group certificates to encrypted files to enable sharing. In this exemplary alternative method, the EFS metadata information includes the security identifier for users and groups that the EFSGS employs to determine user access. This method requires groups to have valid encryption certificates created by the EFSGS and published into Active Directory, or the client agent can directly query EFSGS for a certificate in systems that do not use an Active Directory. It also requires the client agent to sign the EFS metadata information to ensure its certificate set data integrity.

Logical Steps for EFSGS to Perform Access Check on File

Figure 6:
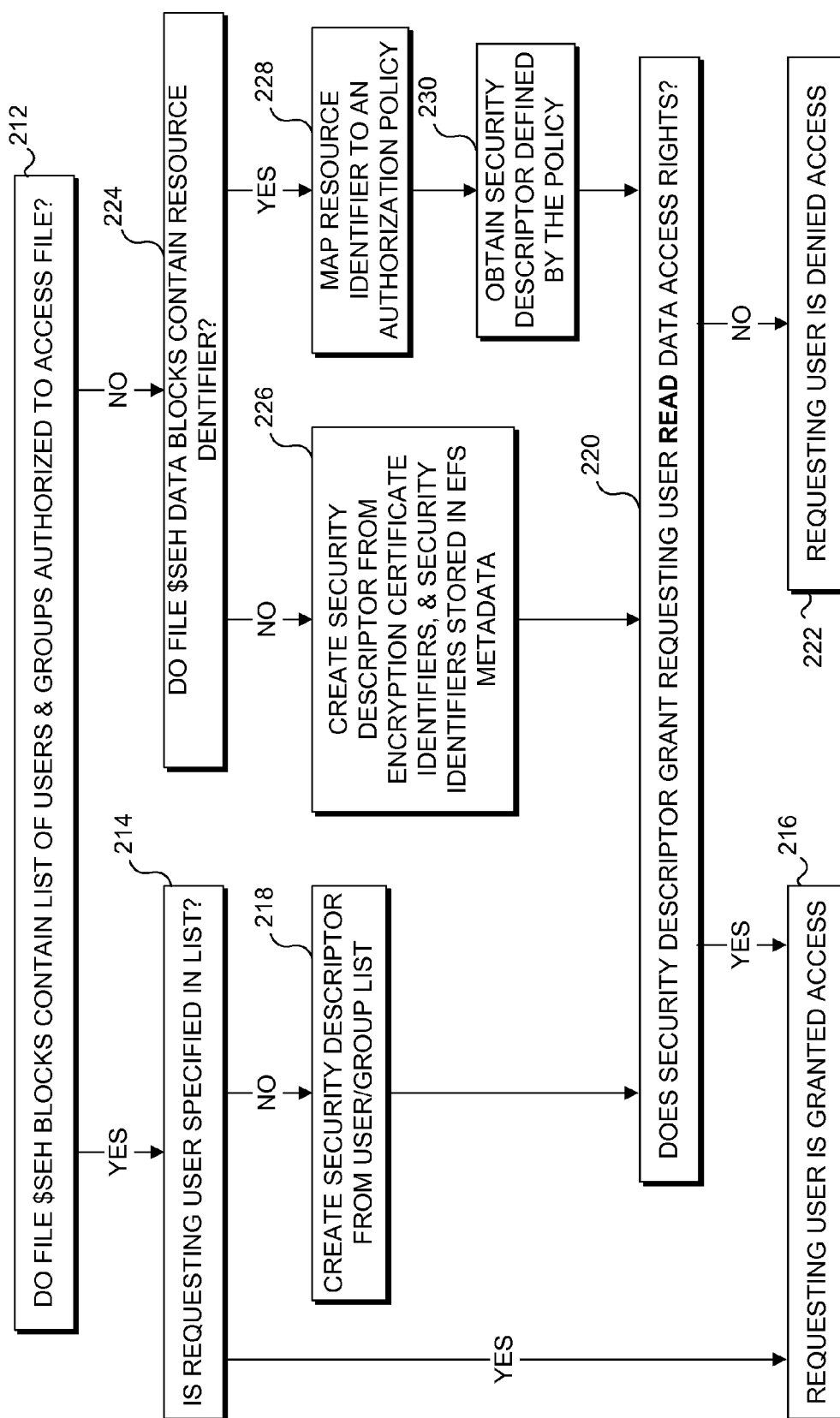
FIG. 6 is a schematic diagram showing exemplary steps for granting service flow control to perform an access check on a file.

A flowchart 210 in FIG. 6 illustrates the exemplary steps employed by the EFSGS to perform an access check on an encrypted file in response to a user requesting access to the encrypted file. A step 212 determines if the $SEH data blocks of the encrypted file contain a list of users and groups who are authorized to access the file. If so, a step 214 determines if the user who has requested access to the encrypted file is specified in the list, either explicitly, or by virtue of being a member of a group that is specified, and if so, a step 216 grants the user access to the encrypted file. If the user is not included in the list in step 214, a step 218 creates a security descriptor from the user and group list. Next, a step 220 determines if the security descriptor grants the user read data access rights to the encrypted file, and if so, step 216 grants the user the requested access. If not, a step 222 denies the user access to the encrypted file.

If, in step 212, the file $SEH stream does not contain a list of users and groups authorized to access the encrypted file, a step 224 determines if the file's $SEH data blocks contain a resource identifier, and if not, a step 226 creates the security descriptor from user encryption certificates, encryption certificate identifiers, and/or security identifiers that are stored in the EFS metadata. The logic then proceeds to step 220. As used herein and in the claims that follow, the term "resource identifier" is intended to reference a specific trusted location where the encrypted file was stored, perhaps when originally created, including without limitation, for example, a domain-based distributed file system, or a specific uniform resource locator (URL) for a web file, or an email account, or an identifier (ID) for a device that is used to store the file. If the response to step 224 is affirmative, a step 228 maps the resource identifier to a predefined authorization policy for the folder (or the system) that pertains to the encrypted file. The resource identifier is thus useful to point to an authorization policy that can be applied to determine if a user should be authorized to access the encrypted file. Next, a step 230 obtains a security descriptor that is defined by this authorization policy, and the logic again proceeds to step 220.

Figure 7:
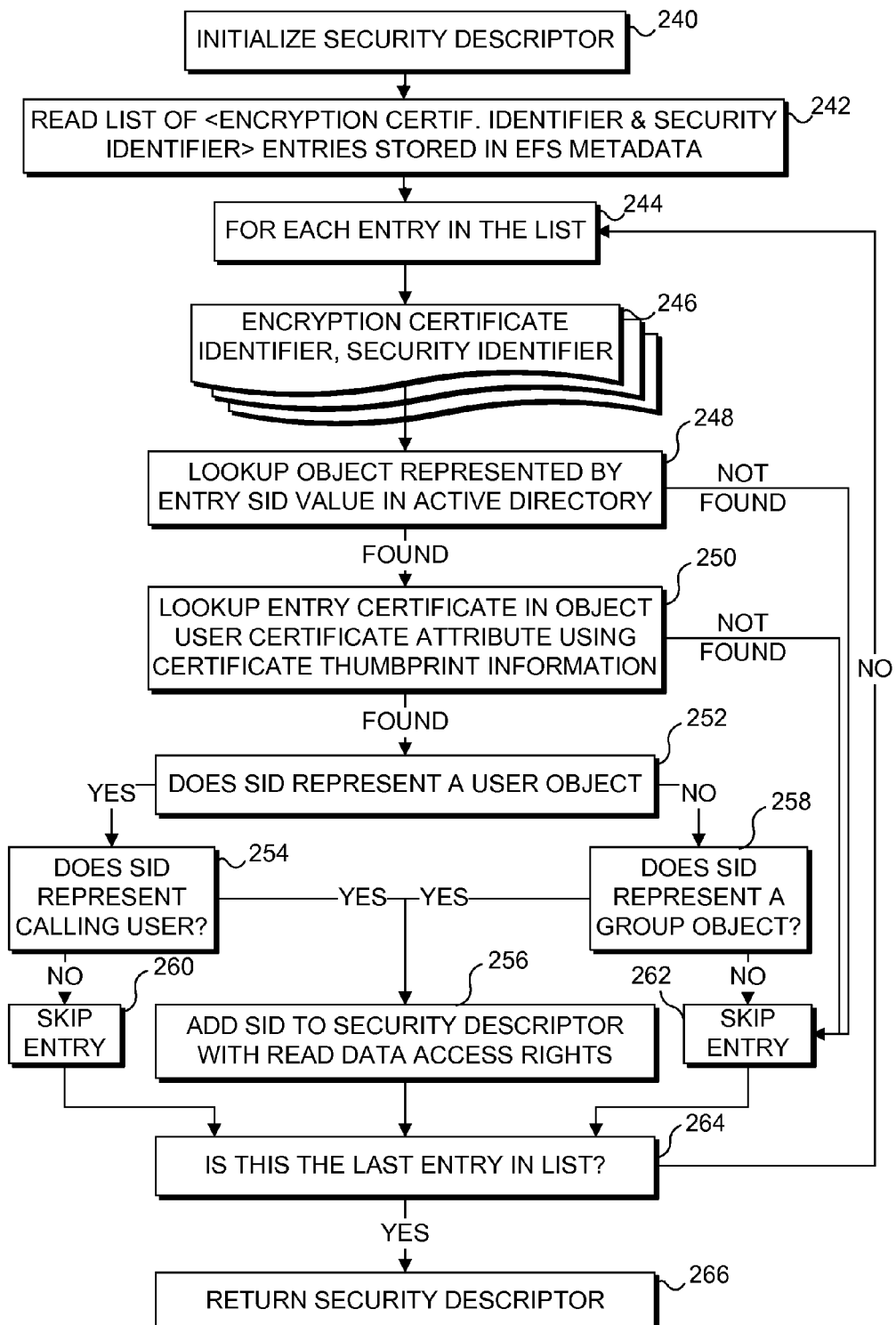
FIG. 7 is a schematic diagram illustrating exemplary steps for a granting service method to build a security descriptor from file EFS metadata.

Further exemplary details for creating a security descriptor in step 226 are shown in FIG. 7. A step 240 initializes the security descriptor. Next, a step 242 reads the list of encryption certificate identifier and security identifier (SID) entries stored in the EFS metadata. In a step 244, for each entry 246 (i.e., for each encryption certificate identifier, and/or SID) in the list, the EFSGS looks up the corresponding data. A step 248 thus looks up an object represented by an entry SID value for the encrypted file in the active directory of the system. If the object is not found, the logic proceeds to a step 262, which skips the entry. If the object is found, a step 250 looks up any entry certificates in the object user encryption certificate identifier attribute using the encryption certificate identifier information—if provided. The encryption metadata contains a list of certificates for thumbprint and subject name (username), and security identities (SID), along with the encrypted FEK.

As used above, the term "entry certificate" represents a single entry of this list. If this attribute is not found, the logic again skips the entry, as noted in step 262. If this attribute is found, the logic proceeds with a step 252, which determines if an SID representing the user object is provided. If so, a step 254 determines if the SID represents the calling user (i.e., the user requesting access to the encrypted file), and if so, a step 256 adds the SID to the security descriptor, with read data access rights for the user. If not, a step 260 provides for skipping the entry. If the SID does not represent a user object in step 252, a step 258 determines if the SID represents a group object, and if so, proceeds to step 256. If not, the logic again skips the entry, as provided in step 262. After any of steps 260, 256, or 262, a step 264 determines if the current entry is the last entry in the list, and if so, proceeds to a step 266, which returns the security descriptor that was just completed. If not, the logic loops back to step 244, to process the next entry in the list.

Encrypted File Provisioning

When a new encrypted file is created, the client agent evaluates the current security policy for the folder under which the file is created. If a predefined security policy is found, then the client agent determines from the policy the set of certificate and principle pair mappings that are to be added to the encrypted file EFS metadata information. The client agent determines this information by building a list of <certificate public key and SID> mappings and calls into the function AddUsersToEncryptedFiles( ) with the list. The client agent also queries the file security descriptor and builds an access control list of users and groups that have at least READ_DATA access on the file and are not part of well-known groups and built-in accounts.

Next, the client agent creates a signing key pair and reads the signing public key into a memory buffer. It then creates encrypted $SEH data blocks in the file and writes the signing public key, along with the file access control list. The entire encrypted file state is then extracted into a second buffer in memory via the function ReadEncryptedFileRaw( ). The content of this second buffer includes the complete EFS metadata information, in addition to the raw encrypted $SEH stream data blocks that are used for exchanges with the EFSGS. The buffer is concatenated with the clear byte sequence of the signing public key, hashed via the function CryptHashData( ) and signed with the signing private key via the function CryptSignHash( ). The signature is then written to the $SEH data blocks, and the create operation is completed.

Figure 8:
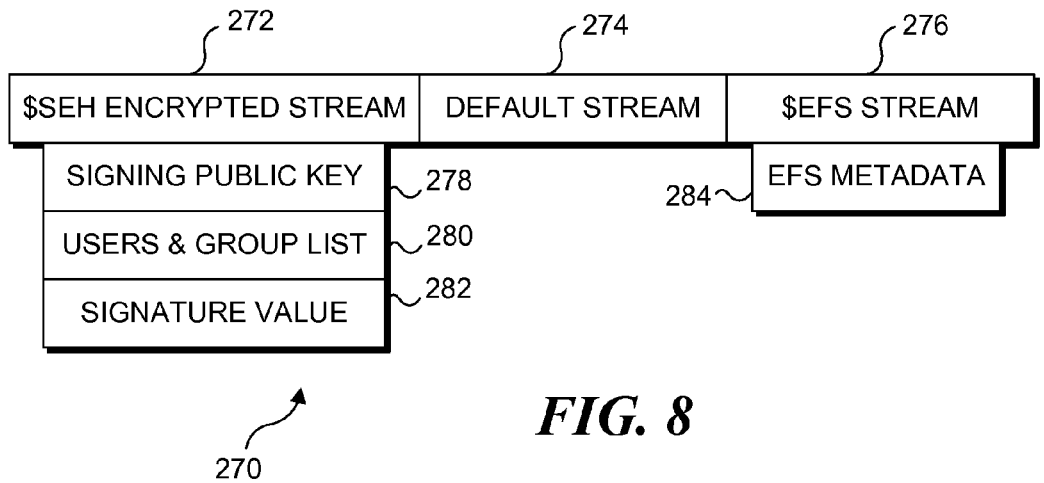
FIG. 8 is a schematic diagram showing an exemplary structure of a buffer containing EFS metadata and raw encrypted security encryption header ($SEH) data blocks.

FIG. 8 illustrates an exemplary encrypted file logical structure 270 that is stored in a buffer for exchange between a client agent and the EFSGS. The encrypted file has three data streams, including an $SEH encrypted data blocks 272, an empty default stream 274, and an $EFS stream 276. $SEH encrypted data blocks 272 include a signing public key 278, a users and group list 280, and a signature value 282. $EFS stream 276 includes EFS metadata 284.

Figure 9:
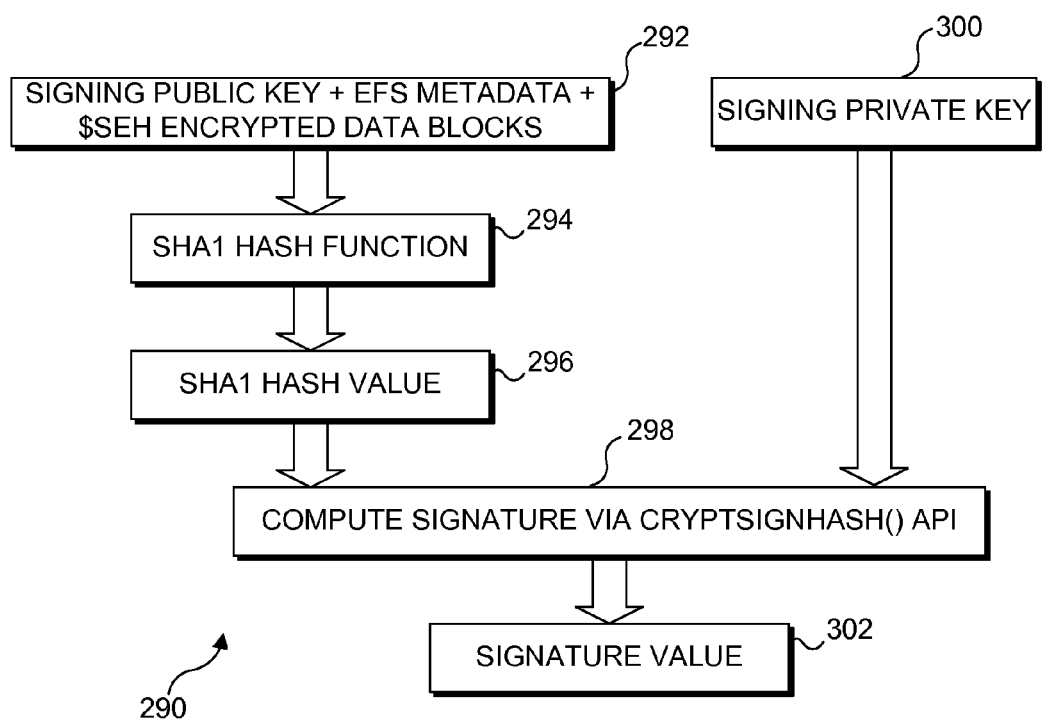
FIG. 9 is a schematic diagram showing exemplary steps of a client agent method for computing a signature of file encryption metadata.

To compute signature value 282 for inclusion in an encrypted file when the encrypted file is created, exemplary logical steps 290 illustrated in FIG. 9 are carried out by the client agent. A step 292 provides that the signing public key, the EFS metadata, and $SEH encrypted data blocks for the encrypted file are accessed by the client agent. Next, a step 294 applies the SHA1 hash function to these components, producing an SHA1 hash value in a step 296. This SHA1 hash value is input to a step 298, along with a signing private key in a step 300. In step 298, the client agent computes the signature using signing public key in the cryptsignhash( ) API, returning the resulting signature value in a step 302, for inclusion in the encrypted file. The signature value that was thus computed replaces a null (all zeros) signature value previously included.

Signature Verification of Encrypted File Metadata

Figure 10:
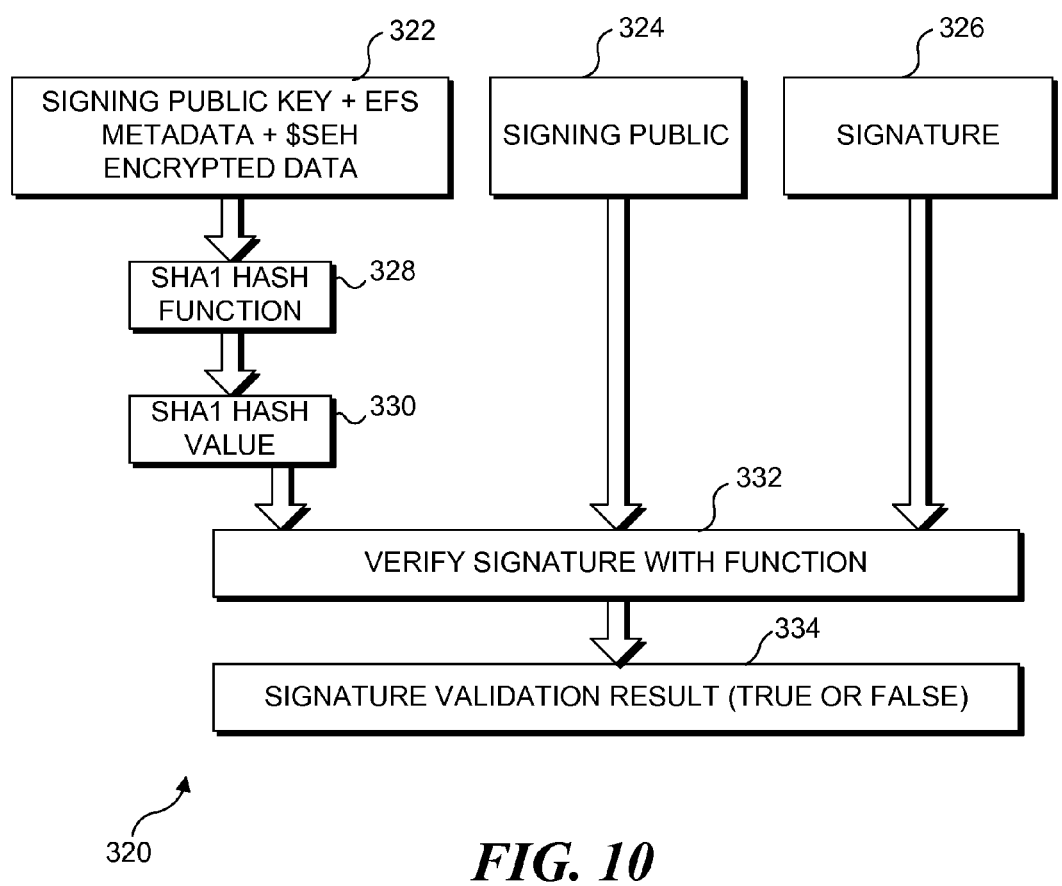
FIG. 10 is a schematic diagram showing exemplary signature verification of file encryption metadata.

Exemplary logical steps 320 for verifying the signature of encrypted file metadata are shown in FIG. 10. In a step 322, the signing public key (separately identified as a signing public key 324), the EFS metadata, and the $SEH encrypted data are obtained for the file being processed. A step 328 applies the SHA1 hash function to these components, returning a SHA1 hash value in a step 330. Signing public key 324 is then applied to digitally sign the SHA1 hash value, producing a test signature. A signature 326 that will be used to validate the test signature and the test signature are input to a step 332, which verifies the test signature (i.e., determines if the test signature equals signature 326), returning a signature validation result (true or false) in a step 334.

Dynamic User Recovery of Encrypted Files

When a user tries to access an encrypted file but doesn't own a valid private key for the file, the user access request is denied by the file system, e.g., Microsoft Corporation's New Technology File System (NTFS). The client agent detects this condition and verifies that the access denied error is on an encrypted file and not due to access control permission failure, i.e., is due to the user lacking a valid certificate. The client agent also checks whether this encrypted file was not previously processed for this user. The client agent delays the user open file operation while trying to transparently resolve the error.

The client agent extracts the EFS metadata information from the accessed encrypted file and obtains the current user EFS certificate public key information in preparation to rendezvous with the EFSGS. The client agent uses its network helper service to locate the EFSGS in the network and sends both pieces of information to the EFSGS. The EFSGS authenticates the user to identify the user in the domain and then imports the EFS metadata from the request buffer into a local encrypted file via the function WriteEncryptedFileRaw( ) and verifies that tampering with the imported EFS metadata has not occurred. The service opens the special $SEH stream in its local file and reads the signing public key and resource identifier. If the EFSGS is unable to read the $SEH stream, the request fails, with access denied. The EFSGS then establishes a key context by importing the signing public information using the function CryptImportKey( ). The EFSGS next concatenates the EFS metadata information with the signing public key and hashes the byte stream with the function CryptHashData( ). The resulting hash value is verified against the signature stored in the EFS metadata information using the function CryptVerifySignature( ). If the hashed value doesn't match the signature, the request fails, with access denied.

The EFSGS then extracts the encryption certificate set from its local file via a function QueryUsersOnEncryptedFile( ). The certificate set and resource identifier are used to determine the authorization information, to determine whether the user is allowed access to the file. Once a match is found, the user public key specified in the request is added to the file with a function AddUsersToEncryptedFile( ). This step grants the user access to the encrypted file. The file is then extracted into a raw encrypted byte stream using a function ReadEncryptedFileRaw( ) to obtain the update EFS metadata. The result is returned to the requesting client agent. The client agent replaces the existing EFS metadata in the file with the newly updated EFS metadata returned by the EFSGS. The client agent also marks the encrypted file as being processed for this user. The user open file operation is then replayed against the patched file, and the user will have gained access to the file.

In some cases, the user agent may not be able to replace in-place the EFS metadata of an existing file. In this case, the user can tunnel the new EFS metadata into a temporary file. The new temporary file is created with the new EFS metadata, and the original file raw encrypted data is copied into the temporary file. The temporary file is then renamed over the original file with all other file attributes preserved. It is important to note that both temporary and original files have the same file encryption key (FEK), because the temporary file EFS metadata are derived from the original file EFS metadata, and the FEK value is preserved.

It should also be emphasized that the user file data are never sent to the EFSGS, and only the EFS metadata are transmitted, which makes the system scale to very large files and capable of supporting a large number of users and clients.

Figure 11:
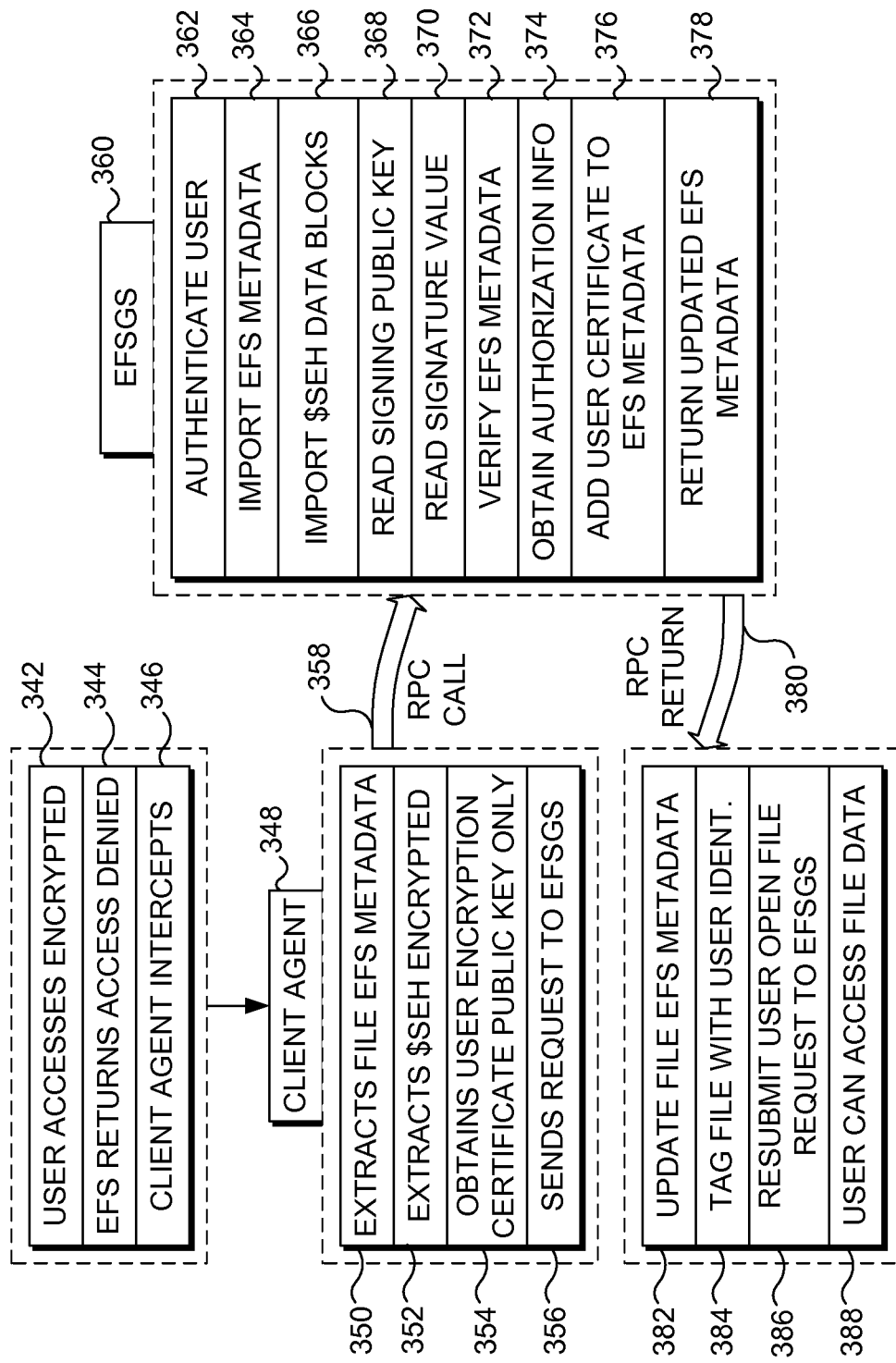
FIG. 11 is a schematic diagram illustrating an exemplary protocol end-to-end flow control to add a user to an encrypted file.

FIG. 11 provides a summary of exemplary steps 340 that are carried out when a user who is not explicitly included in the authorization information attempts to access an encrypted file. In a step 342, the user attempts to access the encrypted file. A step 344 provides that the EFS returns an "Access Denied" message, which is intercepted by a client agent 348 acting for the user, in a step 346. The client agent then extracts the EFS metadata from the encrypted file in a step 350, as well as the $SEH data, in a step 352. Next, the client agent obtains an encryption certificate for the user (e.g., the user's public key) in a step 354 and sends a request to an EFSGS 360, to add the user to the list of those who can access the file, in a step 356. This request is conveyed to EFSGS 360 as a remote procedure call (RPC) 358. In a step 362, EFSGS 360 authenticates the user, for example, by confirming that the user's ID is included with the users in the Active Directory for the network or domain. A step 364 imports the EFS metadata for the file, while a step 366 imports the $SEH data blocks, the EFSGS from the RPC. Next, a step 368 reads the signing public key or encryption certificate for the user, and a step 370 reads the signature value for the encrypted file. The EFS metadata are verified in a step 372 by determining and comparing the signature value with the signature determined by applying the signing public key to the hash value for the imported EFS metadata and $SEH data blocks. A step 374 obtains the authorization information for the user, and if the user should be allowed access to the encrypted file based on the authorization information, the user encryption certificate is added to the EFS metadata in a step 376. Finally, an RPC 380 is used to return the updated EFS metadata to the client agent in a step 378.

The updated EFS metadata are used by the client agent to update the EFS metadata of the encrypted file in a step 382. The encrypted file is thus tagged with the user's identification in a step 384. Finally, the client agent resubmits the user's open file request to the EFSGS in a step 386, and since the user is now included in the list of users/groups authorized to access the encrypted file, the user is able to access the encrypted file in a step 388.

Secure EFS Metadata Updates

In order to ensure that tampering with the EFS metadata has not occurred during transmission or storage, the EFSGS uses data integrity techniques to ensure that the EFS metadata are bound to the file data and that a hacker is not sending EFS metadata that has been hand crafted to trick the EFSGS to include the hacker public key with file EFS metadata to which the hacker would otherwise have no access. Whenever a new encrypted file is created, the client agent creates a special file stream $SEH on the file that is also encrypted with the same FEK as the file data and stores a signature of the file EFS metadata and raw encrypted $SEH data, along with the signing public key information. The signature is derived by signing the signing public key, EFS metadata, and raw encrypted $SEH stream with the signing private key, which may be of the user who created the file, or can be a system or user signing key pairs. This signing private key is different than the encryption key and is simply a signing key that enables the service to validate the integrity of the data $SEH and EFS metadata. When the EFSGS receives the EFS metadata along with the special $SEH data blocks raw encrypted data, it imports these data to create a local encrypted file with the special $SEH data blocks and EFS metadata. The EFSGS opens the special $SEH data blocks to retrieve the signature and signing public key which can be used to verify the received EFS metadata are what the client agent generated when the encrypted file was initially created by a user. The EFSGS then verifies that the signature of the received signing public key, EFS metadata, and raw encrypted $SEH stream matches the signature stored in the special $SEH stream header. If the signatures don't match or the EFSGS is unable to open the special $SEH data blocks because it doesn't have the right encryption certificate, then the call to patch the encrypted file is rejected. Only encrypted files that have the correct signature and which were encrypted with one of the EFSGS encryption certificates can be patched. Furthermore, the FEK used to generate the EFS metadata and to encrypt the special $SEH data blocks must be the same, or the signatures won't match. It will thus be evident that this approach protects against spoofing attacks.

Key Delegation Option

The EFSGS also supports key delegation to specific users, based on its authorization policy. Instead of having the EFSGS process requests for each encrypted file from a given user, the system can be provisioned to allow the EFSGS to return its private key to the client agent to enable offline access. In this way, the client agent can add user certificates locally without having to contact the EFSGS for each file the user doesn't have access to. The client agent uses the same authorization policy as the EFSGS to determine whether a local user is granted access to an encrypted file. The private key returned to the client agent is stored in a secure location private to the operating system. The EFSGS private key and authorization information can be cached by the client agents only for a specific period of time as set forth by a predefined security policy. This feature can also be used, for example, to grant the computer account offline access to encrypted logon scripts and group policy files in a domain environment, which enables an enterprise to protect policy files in Domain Controllers located in branch offices of the enterprise.

Signature Details

The EFS metadata signature is generated by the client agent and verified by the EFSGS as follows:

a. Each encrypted file contains special encrypted $SEH data blocks that hold the signing public key.
b. The client agent computes the SHA1 hash of <signing public key+EFS metadata+raw encrypted $SEH stream>.
c. The client agent signs the SHA1 hash value with the signing private key to produce the validation signature. This signature is stored as part of the encrypted file metadata.
d. On file access, the client agent sends the file EFS metadata, signature, and raw encrypted data of the special $SEH data blocks to the EFSGS.

e. The EFSGS generates a temporary encrypted file from the received EFS metadata and raw encrypted $SEH data blocks for the file.
f. The EFSGS reads the special $SEH data blocks in the temporary file to load the signing public key.
g. The EFSGS computes the SHA1 hash of <signing public key+EFS metadata+raw encrypted $SEH stream>.
h. The EFSGS verifies that the signature received in the request matches the signature value computed in the preceding step by the SHA1 hash.

Authorization Policies

The system supports different authorization mechanisms to check user access, including Direct Mapping and Dynamic Groups based on Authorization Manager.

Simple Direct Mapping Based on Active Directory Principle Objects

This authorization policy is driven by a simple mapping function that is defined by the current "memberof" attribute for an object in the Active Directory or in some other authoritative identity store. Each principle name identified by the SID field in the file certificate set is checked for membership against the calling user requesting access to an encrypted file. If the calling user is found in any of the group or user objects that are part of the set, then the user is granted access; otherwise, the user is denied access. This model doesn't allow for exceptions, but there is no authorization policy outside Active Directory to be maintained, and users' permissions are allowed in sync with what is stored in the Active Directory. In this model, the set of users and groups authorized to access the encrypted file are bound to the file when the encrypted file was created.

For each principle name in the file EFS metadata certificate set identified by its universal principle name (UPN) or security identifier (SID), the usercertificate attribute of its object can be looked up in the Active Directory and checked against the certificate hash ID in the EFS metadata information. In systems of applications that do not use an Active Directory, the user UPN may represent the user email address, e.g., in Windows Live ID or Yahoo. Active Directory is used in this exemplary embodiment for authentication only. In the case of a group, then the Active Directory is also used for authorization, because it contains the mapping between group name and users.

If the certificate hash ID is found in the usercertificate attribute of the object, and if the object belongs to the calling user, then access is granted.

If the object belongs to a group and the calling user is a member of the group, then access is granted.

Otherwise, access is denied.

Active Directory Advanced Mode

This model is a superset of the previous model, enables greater flexibility, and supports exceptions. The system uses Authorization Manager (AzMan) dynamic group policy mechanism to check for user authorization and defines four user roles that are applied against users, including: grant role; deny role; delegate role; and, map role. These roles are defined as follow:

1. Grant—grant access to all users in this role;
2. Deny—deny access to all users in this role;
3. Delegate—grant access to service certificate private key to all users in this role; and
4. Map—use the simple direct mapping scheme for all users in this role.

The service uses certificates subject name and encryption certificate identifiers to look up an authorization manager store. The calling user is evaluated against the store policy to determine the user role and executes the role-defined action. If no store is found, then the service uses simple direct mode.

EFSGS Details

The EFSGS processes client request to grant users access to encrypted files and add the encryption certificate for a user requesting access to update the EFS metadata for the encrypted file. On input of the request, it accepts encrypted file EFS metadata information along with the corresponding $SEH data blocks, and a user EFS public key certificate for the encrypted file. The EFSGS response buffer contains one of the following types of information based on the call result.

Condition 1: Grant user access:
a. Return status "Success;" and
b. New EFS metadata information that includes the specified user public key for return to the caller, granting the user read access to decrypt (i.e., access) the file data.

Condition 2 (i.e., alternative): Delegate group certificate private key:
c. Return status "More Processing Required;" and
d. A private key certificate and expiry time both encrypted with the specified user public key are returned instead. The client agent then extracts and caches the returned service private key to process files offline.

Condition 3: Deny user access
e. Return status "Access Denied."

An exemplary service algorithm implemented by the EFSGS includes the following steps:

```
- authenticate and certify identity of the user;
- import specified EFS metadata information;
- verify that the EFS metadata signature is valid;
- query users' certificate set on imported file;
- prune-out self-signed certificates or subject names not belonging to valid
    domain;
- check certificates for revocation based on subject names and certificates' hashid
- if user is part of the certificate set, then
      grant access
- else
            for each entry in the set
                  obtain entry SID
                  if SID entry is valid then
                              if SID object type is user and SID is for calling
                  user then
                                    grant access
                              else if SID object type is group
                                    check if calling user is a member of the
                                    group
```

```
                    if true then
                            grant access
                        endif
            endif
            if access is granted then
                    break
            obtain certificate subject name and hash id
            map subject name or hash id to a resource policy
        if such mapping exists in authorization store
                        use AZMAN to determine authorization
            else
                lookup subject name in AD
                    if object exists then
                        get object usercertificate attribute
                        verify certificate is part of current
                        certificate set check if user is part of memberof
                        attribute of object if true then
                                grant access
                                break
                        endif
                endif
        endif
    done
    if access is granted then
            add user to encrypted file
            export encrypted file
            return exported EFS metadata and $SEH stream blob to user
    endif
```

Exemplary Application

The present approach can be employed in various applications. For example, it can be used for secure distribution of logon scripts and group policy files to computers in branch offices of an enterprise. Each branch office might be equipped with a domain controller that receives policy files from the headquarter domain controller. However, the branch office domain controller may not be as secure as the headquarter domain controller, and the policy files are distributed in encrypted form. Client computers will be able to decrypt the policy files by contacting the EFSGS deployed in the headquarter domain controller. Although, the policy files were distributed via the less secure domain controller, the policy files are protected throughout the distribution.

Exemplary Computing Device for Implementing the Present Approach

Figure 12:
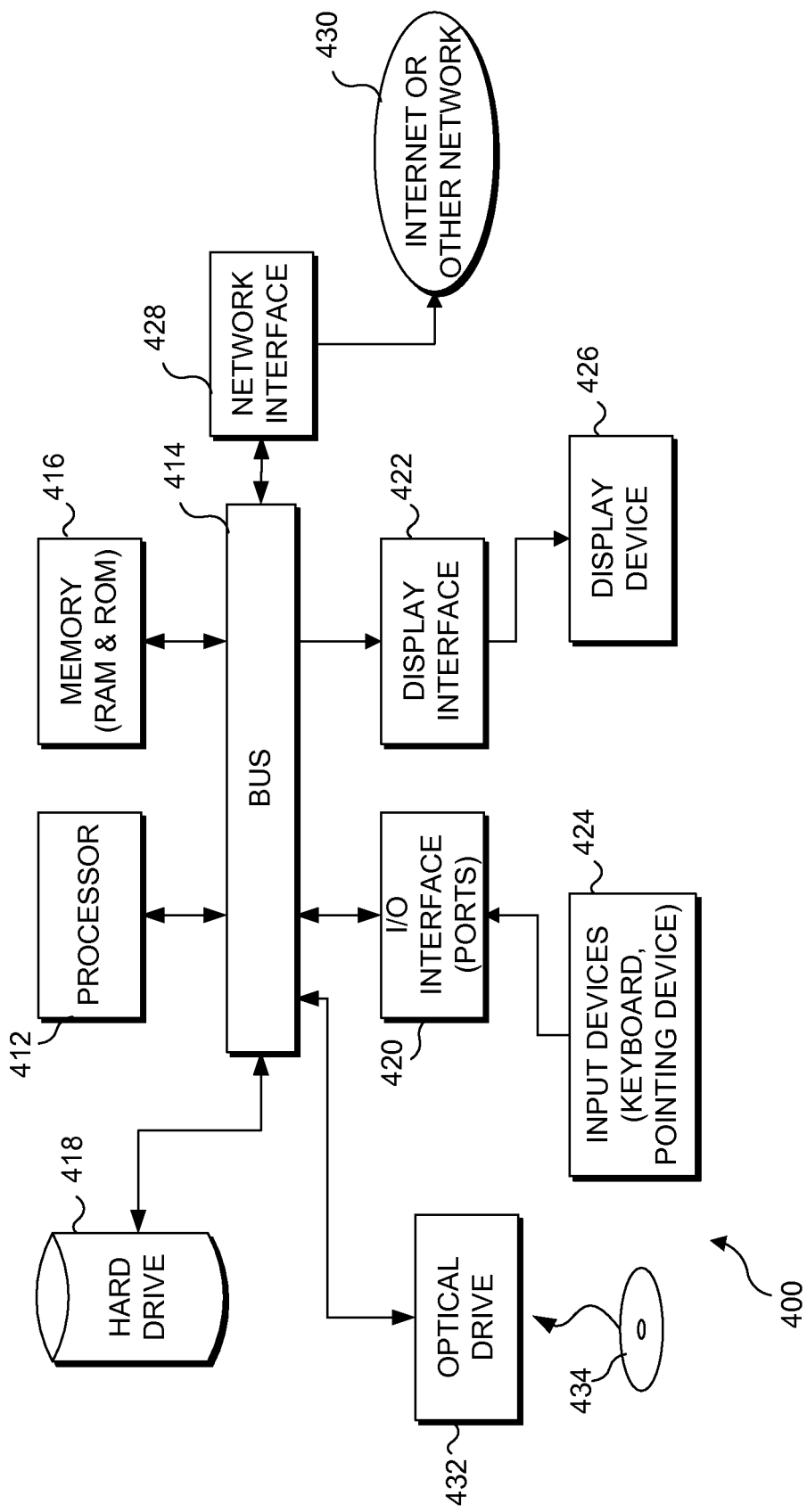
FIG. 12 is a functional block diagram of a generally conventional computing device that is suitable for implementing the present novel approach.

FIG. 12 illustrates details of a functional block diagram for a computing device 400 that is useful for performing the functions of the client agent, or the functions of the EFSGS. The computing device can be a typical personal computer, including laptop, desktop, server, or other type of general purpose device that executes a software program to carry out portions of the novel approach described above, but can take other forms such as a logic circuit or a hardwired device that carries out steps of the present novel procedure, either as the client agent, or as the EFSGS.

In this exemplary embodiment of a computing device, a processor 412 is employed for executing machine instructions that are stored in a memory 416. The machine instructions may be transferred to memory 416 from a data store 418 over a generally conventional bus 414, or may be provided on some other form of memory media, such as a digital versatile disk (DVD), a compact disk read only memory (CD-ROM), or other non-volatile memory device. An example of such a memory medium is illustrated by a CD-ROM 434. Processor 412, memory 416, and data store 418, which may be one or more hard drive disks or other non-volatile memory, are all connected in communication with each other via bus 414. The machine instructions in the memory are readable by the processor and executed by it to carry out the functions of the exemplary embodiments discussed above. Also connected to the bus may be a network interface 428 to enable communication with a network 430 (or the Internet), an input/output interface 420 (which may include one or more data ports such as any of a serial port, a universal serial bus (USB) port, a Firewire (IEEE 1394) port, a parallel port, a personal system/2 (PS/2) port, etc.), and a display interface or adaptor 422.

Any one or more of a number of different input devices 424 such as a keyboard, mouse or other pointing device, trackball, touch screen input, etc., are connected to I/O interface 420. A monitor or other display device 426 is coupled to display interface 422, so that a user can view graphics and text produced by the computing system as a result of executing the machine instructions, both in regard to an operating system and any applications being executed by the computing system, enabling a user to interact with the system. An optical drive 432 is included for reading (and optionally writing to) CD-ROM 434, or some other form of optical memory medium.

Although the concepts disclosed herein have been described in connection with the preferred forms of practicing them and modifications thereto, those of ordinary skill in the art will understand that many other modifications can be made within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for transparently managing user access of encrypted files, comprising the steps of:
    (a) provisioning each encrypted file with:
        (i) a trusted service account encryption certificate that enables a trusted service to add one or more encryption certificates to the encrypted file for one or more users or other entities that should be authorized to access a content of the encrypted file;

(ii) special signed encrypted data blocks that include authorization information indicating one or more entities that can access the encrypted file;
(iii) encrypting file system metadata for the encrypted file that are signed with a signing key; and
(iv) a digital signature determined by hashing the encrypting file system metadata and special encrypted data blocks and using a signing key; and (b) when a user attempts to access an encrypted file, performing the following steps:
(i) authenticating the user by accessing an authentication service that can authenticate the user; and if the user is authenticated by the authentication service,
(ii) granting access to the encrypted file to the user if the authorization information indicates that the user should be granted access and if the authentication service authenticates the user; and if not,
(iii) determining whether the user should be granted access to the file based either on a security descriptor for the file or a resource identifier that is included in the authorization information of the special encrypted data blocks; and if so,
(iv) using the trusted service to add an encryption certificate for the user to the encrypting file system metadata, so that the user is granted access to the encrypted file; and
(v) if the user is not specified in the authorization information and it is determined that the user should not be granted access to the file based on the authorization information, or if the user is not authenticated by the authentication service, denying the user access to the encrypted file.

2. The method of claim 1, wherein the step of using the trusted service to add the encryption certificate for the user to the encrypting file system metadata comprises the steps of:
(a) transmitting to the trusted service a request to add the encryption certificate for the user to the encrypting file system metadata of the encrypted file, the request including the special encrypted data blocks, the encrypting file system metadata, and the digital signature from the encrypted file;
(b) importing the special encrypted data blocks, and the encrypting file system metadata into a temporary encrypted file; and
(c) employing the trusted service for:
(i) computing a test signature value for the special encrypted data blocks and the encrypting file system metadata using a signing key that is included with the special encrypted data blocks;
(ii) comparing the test signature value that was thus computed with the signature value from the encrypted file; and
(iii) if the test signature value that was computed matches the signature value from the encrypted file, then, based upon authorization information for the encrypted file, determining if the user should be granted access to the encrypted file; and if so,
(iv) adding an encryption certificate public key for the user to the encrypting file system metadata; and, if the user should not be granted access to the encrypted file,
(v) denying the user access to the encrypted file.

3. The method of claim 2, wherein if it is determined that the user should be granted access, but a policy does not grant key delegation to the trusted service, the step of adding the encryption certificate for the user comprises the steps of:

(a) adding the encryption certificate public key for the user to the temporary encrypted file to create updated encrypting file system metadata;
(b) extracting the updated encrypting file system metadata from the temporary encrypted file; and
(c) returning the updated encrypted files system metadata, for use by the user in accessing the encrypted file.

4. The method of claim 2, wherein if a policy grants key delegation to the trusted service, the step of adding the encryption certificate public key for the user comprises the steps of:
(a) identifying an encryption certificate that should be returned to a caller that requested the user to be authorized to access the encrypted file;
(b) signing and encrypting the encryption certificate private key; and
(c) returning the encrypted certificate private key to the caller, to enable the caller to determine who accesses the encrypted file based on the authorization information.

5. The method of claim 2, wherein the step of determining the digital signature comprises the steps of:
(a) extracting the special signed encrypted data blocks and the encrypting file system metadata for the encrypted file;
(b) applying a hash function to the special signed encrypted data blocks and the encrypting file system metadata to produce a hash value; and
(c) computing the digital signature by digitally signing the hash value with a private signing key.

6. The method of claim 2, further comprising the step of employing a set of file encryption certificates that are controlled by a policy, in connection with controlling access of all encrypted files that are stored in a specific location.

7. The method of claim 1, wherein the step of determining whether the user should be granted access to the file comprises the steps of:
(a) determining if the authorization information includes a list of users or other entities authorized to access the encrypted file; and if not, determining if the authorization information includes a resource identifier; and if so:
(i) mapping the resource identifier to an authorization policy for the encrypted file that is indicated by the resource identifier; and
(ii) obtaining a security descriptor defined by the authorization policy;
(b) but, if the authorization information does not include a list of users or other entities authorized to access the encrypted file, and if the authorization information does not include the resource identifier, creating the security descriptor from data stored in the encrypting file system metadata, including at least one of:
(i) an encryption certificate identifier for the user; and
(ii) a security identifier for the user; and
(c) and thereafter determining if the security descriptor that was obtained or created grants the user read access rights for the encrypted file; and if so, granting the user access to the encrypted file, but if not, denying the user access to the encrypted file.

8. The method of claim 7, wherein the step of creating the security descriptor comprises the steps of:
   (a) reading entries of encryption certificate identifiers, and security identifiers that are included in the encrypting file system metadata of the encrypted file;
   (b) for each entry that is read:
      (i) attempting to lookup an object represented by an entry of a security identifier value in an active directory for a network in which the encrypted file is to be accessed; and if found,
      (ii) attempting to lookup an entry of an encrypted certificate in a user encryption certificate attribute using the encrypted certificate identifier; and if found,
      (iii) determining if the security identifier represents a user object; and if so,
      (iv) creating the security descriptor with read access rights for the user, and similarly processing any remaining entries; but if results from any of preceding steps (i)-(iii) are negative,
      (v) skipping the entry and similarly processing any remaining entries; and
   (c) returning the security descriptor that was created.

9. The method of claim 7, wherein if the authorization information includes a list of users or other entities authorized to access the encrypted file, further comprising the steps of determining if the user requesting access to the encrypted file is specified in the list, and should thus be granted access to the encrypted file; and if not:
   (a) creating a security descriptor from the group list; and
   (b) determining if the security descriptor grants the user requesting access at least read data access rights for the encrypted file, so that the user can be granted read data access.

10. The method of claim 1, wherein the resource identifier included in the authorization information references a specific trusted location where the encrypted file was stored.

11. A non-transitory memory medium on which are stored machine readable and executable instructions for carrying out step (a) of claim 1, when the machine instructions are executed by a processor.

12. A non-transitory memory medium on which are stored machine readable and executable instructions for carrying out step (b) of claim 1, when the machine instructions are executed by a processor at the trusted service.

13. A system for responding to a request to enable a user to access an encrypted file that is provisioned with a trusted service account encryption certificate, special signed encrypted data block, encrypting file system metadata that are signed with a signing key, and a digital signature, comprising:
   (a) a communication link for receiving the request that includes the special signed encrypted data blocks, the encrypting file system metadata that are signed with the signing key, and the digital signature;
   (b) a processor that is coupled to the communication link; and
   (c) a memory coupled to the processor, the memory storing machine instructions that are executed by the processor to implement a plurality of functions, including:
      (i) authenticating the user by accessing an authentication service that can authenticate the user; and if the user is authenticated by the authentication service,
      (ii) granting access to the encrypted file to the user if the authorization information indicates that the user should be granted access; and if not,
      (iii) determining whether the user should be granted access to the file based either on a security descriptor or a resource identifier for the file, included in the authorization information of the special encrypted data blocks; and if so,
      (iv) adding an encryption certificate for the user to the encrypting file system metadata, so that the user will be granted access to the encrypted file; and
      (v) if the user is not specified in the authorization information and it is determined that the user should not be granted access to the file based on the authorization information, or if the user is not authenticated by the authentication service, denying the user access to the encrypted file.

14. The system of claim 13, wherein the machine instructions, when executed by the processor, further cause the processor to:
   (a) import the special encrypted data blocks, and the encrypting file system metadata from the encrypted file into a temporary encrypted file;
   (b) compute a test signature value for the special encrypted data blocks and the encrypting file system metadata using a signing key that is included with the special encrypted data blocks;
   (c) comparing the test signature value that was thus computed, with the signature value from the encrypted file; and if the test signature value that was computed matches the signature value from the encrypted file,
   (d) based upon authorization information for the encrypted file, determining if the user should be granted access to the encrypted file; and if so,
   (e) adding an encryption certificate public key for the user to the encrypting file system metadata; and, if the user should not be granted access to the encrypted file,
   (f) denying the user access to the encrypted file.

15. The system of claim 14, wherein if it is determined that the user requesting access should be granted access, but a policy does not grant key delegation so that the processor is authorized to do so, the machine instructions further cause the processor to implement the following functions:
   (a) add the encryption certificate public key for the user to the temporary encrypted file to create updated encrypting file system metadata;
   (b) extract the updated encrypting file system metadata from the temporary encrypted file; and
   (c) transmit the updated encrypted files system metadata to a site for use in enabling the user to access the encrypted file.

16. The system of claim 14, wherein if it is determined that the user requesting access should be granted access, and a policy grants key delegation so that the processor is authorized to do so, the machine instructions further cause the processor to implement the following functions:
   (a) identify an encryption certificate that should be returned to enable the user to access the encrypted file;
   (b) signing and encrypting an encryption certificate private key; and
   (c) transmit the signed encrypted certificate private key to a site for use at the site in determining who accesses the encrypted file based on the authorization information.

17. The system of claim 14, wherein the machine instructions cause the processor to employ a set of file encryption certificates that are controlled by a policy, in connection with controlling access of all encrypted files that are stored in a specific location.

18. The system of claim 14, wherein the machine instructions cause the processor to determine whether the user should be granted access to the file by implementing the following functions:

(a) determine if the authorization information includes a list of users or other entities authorized to access the encrypted file; and if not,
(b) determine if the authorization information includes a resource identifier; and if so:
  (i) map the resource identifier to an authorization policy for the encrypted file that is indicated by the resource identifier; and
  (ii) obtain a security descriptor defined by the authorization policy; otherwise,
(c) if the authorization information does not include the resource identifier, create the security descriptor from data stored in the encrypting file system metadata, including at least one of:
  (i) an encryption certificate identifier for the user; and
  (ii) a security identifier for the user;
(d) determine if the security descriptor that was obtained or created grants the user read access rights for the encrypted file; and if so,
(e) grant the user access to the encrypted file, but if not, denying the user access to the encrypted file.

19. The system of claim 18, wherein the machine instructions cause the processor to create the security descriptor by implementing the following functions:
(a) reading entries of encryption certificate identifiers, and security identifiers that are included in the encrypting file system metadata;
(b) for each entry read:
  (i) attempting to lookup an object represented by an entry of a security identifier value in an active directory for a network in which the encrypted file is to be accessed; and if found,
  (ii) attempting to lookup an entry of an encrypted certificate in an object user encrypted certificate attribute, using the encrypted certificate identifier; and if found,
  (iii) determining if the security identifier represents a user object; and if so,
  (iv) creating the security descriptor with read access rights for the user, and similarly processing any remaining entries; but if results from any of preceding subparagraphs (i)-(iii) are negative,
  (v) skipping the entry and similarly processing any remaining entries; and
(c) returning the security descriptor that was created.

20. The system of claim 18, wherein if the authorization information includes a list of users or other entities authorized to access the encrypted file, the machine instructions cause the processor to:
(a) determine if the user requesting access to the encrypted file is specified in the list, and should thus be granted access to the encrypted file; and if not:
(b) create a security descriptor from the group list; and
(c) determine if the security descriptor grants the user requesting access at least read data access rights for the encrypted file, so that the user can be granted read data access.

21. The system of claim 13, wherein the resource identifier included in the authorization information references a specific trusted location where the encrypted file was stored.

22. A method for transparently managing user access of encrypted files, comprising the steps of:
(a) provisioning each encrypted file with:
  (i) a trusted service account encryption certificate that enables a trusted service to add one or more encryption certificates to the encrypted file for one or more users or other entities that should be authorized to access a content of the encrypted file;
  (ii) special signed encrypted data blocks that include authorization information indicating one or more entities that can access the encrypted file, the authorization information comprising a list of users, or groups, or other entities authorized to access the encrypted file;
  (iii) encrypting file system metadata for the encrypted file that are signed with a signing key; and
  (iv) a digital signature determined by hashing the encrypting file system metadata and special encrypted data blocks and using a signing key; and
(b) when a user attempts to access an encrypted file, performing the following steps:
  (i) authenticating the user by accessing an authentication service that can authenticate the user; and if the user is authenticated by the authentication service,
  (ii) granting access to the encrypted file to the user if the authorization information indicates that the user should be granted access and if the authentication service authenticates the user; and if not,
  (iii) determining whether the user should be granted access to the file based either on:
    (1) a security descriptor for the file, the security descriptor being based on at least one of user encryption certificate identifiers stored in the file, and user security identifiers stored in the file; or
    (2) a resource identifier that is included in the authorization information of the special encrypted data blocks, the resource identifier comprising a specific trusted location where the encrypted file is stored, the resource identifier enabling a predefined authorization policy for the encrypted file to be accessed; and if so,
  (iv) using the trusted service to add an encryption certificate for the user to the encrypting file system metadata, so that the user is granted access to the encrypted file; and
  (v) if the user is not specified in the authorization information and it is determined that the user should not be granted access to the file based on the authorization information, or if the user is not authenticated by the authentication service, denying the user access to the encrypted file.

* * * * *